United States Patent
Choi et al.

(10) Patent No.: US 12,001,808 B2
(45) Date of Patent: Jun. 4, 2024

(54) METHOD AND APPARATUS FOR PROVIDING INTERPRETATION SITUATION INFORMATION TO ONE OR MORE DEVICES BASED ON AN ACCUMULATED DELAY AMONG THREE DEVICES IN THREE DIFFERENT LANGUAGES

(71) Applicant: SAMSUNG ELECTRONICS CO., LTD., Suwon-si (KR)

(72) Inventors: Yoonjung Choi, Suwon-si (KR); Sangha Kim, Suwon-si (KR); Hakjung Kim, Suwon-si (KR); Yoonjin Yoon, Suwon-si (KR); Seokchan Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/435,995

(22) PCT Filed: Aug. 23, 2021

(86) PCT No.: PCT/KR2021/011210
§ 371 (c)(1),
(2) Date: Sep. 2, 2021

(87) PCT Pub. No.: WO2022/050615
PCT Pub. Date: Mar. 10, 2022

(65) Prior Publication Data
US 2023/0186036 A1 Jun. 15, 2023

(30) Foreign Application Priority Data
Sep. 2, 2020 (KR) .................. 10-2020-0111460

(51) Int. Cl.
*G06F 40/58* (2020.01)
*G06F 40/44* (2020.01)
(Continued)

(52) U.S. Cl.
CPC .............. *G06F 40/58* (2020.01); *G10L 21/04* (2013.01); *G10L 25/87* (2013.01); *G06F 40/44* (2020.01); *G10L 15/183* (2013.01)

(58) Field of Classification Search
CPC .......... G06F 40/44; G06F 17/28; G06F 15/38; G06F 40/58; G10L 15/183
See application file for complete search history.

(56) References Cited

U.S. PATENT DOCUMENTS

| 9,600,474 B2 | 3/2017 | Cuthbert et al. |
| 2008/0077390 A1 | 3/2008 | Nagao |

(Continued)

FOREIGN PATENT DOCUMENTS

| JP | H10283356 A | * | 10/1998 | ............. G06F 17/28 |
| JP | 2006-031448 A | | 2/2006 | |

(Continued)

OTHER PUBLICATIONS

International Search Report and Written Opinion dated Dec. 7, 2021, issued by the International Searching Authority in International Application No. PCT/KR2021/011210 (PCT/ISA/220, 210, 237).

(Continued)

*Primary Examiner* — Farzad Kazeminezhad
(74) *Attorney, Agent, or Firm* — Sughrue Mion, PLLC

(57) ABSTRACT

A method is provided. The method includes receiving a speech input in a first language from a first device; obtaining, by using an artificial intelligence (AI) model, an estimated interpretation time that indicates a time expected to be required to interpret the speech input in the first language into a second language; transmitting, based on the estimated interpretation time, interpretation situation information to at least one of the first device or a second device; interpreting the speech input in the first language into the second (Continued)

language; and transmitting, to the second device a result of the interpreting of the speech input into the second language.

15 Claims, 20 Drawing Sheets

(51) Int. Cl.
  *G10L 15/183* (2013.01)
  *G10L 21/04* (2013.01)
  *G10L 25/87* (2013.01)

(56) References Cited

U.S. PATENT DOCUMENTS

| | | | |
|---|---|---|---|
| 2012/0185235 | A1 | 7/2012 | Albat |
| 2019/0138605 | A1* | 5/2019 | Black .................. G06F 40/58 |
| 2021/0082407 | A1* | 3/2021 | Kim .................. G10L 15/183 |
| 2021/0232777 | A1* | 7/2021 | Zhang .................. G06F 40/44 |

FOREIGN PATENT DOCUMENTS

| | | | |
|---|---|---|---|
| JP | 2007-280137 A | 10/2007 |
| JP | 4432810 B2 | 3/2010 |
| KR | 10-2019-0052365 A | 5/2019 |
| KR | 10-2060229 B1 | 2/2020 |

OTHER PUBLICATIONS

Communication issued Sep. 26, 2023 by the European Patent Office in European Patent Application No. 21864576.0.

\* cited by examiner

METHOD AND APPARATUS FOR PROVIDING INTERPRETATION SITUATION INFORMATION TO ONE OR MORE DEVICES BASED ON AN ACCUMULATED DELAY AMONG THREE DEVICES IN THREE DIFFERENT LANGUAGES

TECHNICAL FIELD

The disclosure relates to a method and apparatus for providing interpretation situation information, and more particularly, to a method and apparatus for providing feedback with respect to an interpretation situation in a multi-party simultaneous interpretation mode.

BACKGROUND ART

An artificial intelligence (AI) system is a computer system that emulates human-level intelligence, and enables machines to learn and make decisions on their own, unlike existing rule-based smart systems. As an AI system processes data, the AI system may improve recognition rates and more accurately understand a user's preferences. In this regard, existing rule-based smart systems are increasingly being replaced with deep learning-based AI systems.

AI technology consists of machine learning (deep learning) and element technologies using machine learning.

Machine learning is an algorithmic technology for autonomously classifying/learning features of input data. Element technologies simulate functions of a human brain, such as cognition and decision-making, by using machine learning algorithms, such as deep learning, and may be used in technical fields such as linguistic understanding, visual understanding, reasoning/prediction, knowledge representation, motion control, etc.

AI technology may be applied to various technical fields, including the following. Linguistic understanding is a technology for recognizing and applying/processing human language/characters and includes natural language processing, machine translation, a dialog system, question answering, speech recognition/synthesis, etc. Visual understanding is a technology for recognizing and processing an object in in a manner similar to a human visual system, and includes object recognition, object tracking, image retrieval, person recognition, scene understanding, spatial understanding, image enhancement, etc. Reasoning/prediction is a technology for judging information and logically inferring and predicting new information and includes knowledge/probability-based inferring, optimization prediction, preference-based planning, recommendations, etc. Knowledge representation is a technology for automatically processing information about human experience as knowledge data and includes knowledge construction (data generation/classification), knowledge management (data utilization), etc. Motion control is a technology for controlling autonomous driving of a vehicle and motion of a robot and includes movement control (navigation, collision avoidance, and travelling), manipulation control (action control), etc. AI technology may also be applied to the field of recognizing a human's speech and translating or interpreting the recognized speech into another language.

DESCRIPTION OF EMBODIMENTS

Technical Problem

In an interpretation situation where a speaker's utterance is interpreted into a plurality of target languages and output to a plurality of listeners, information about an interpretation situation for each target language needs to be provided so that conversations may proceed smoothly with minimal delay.

Technical Solution to Problem

According to embodiments of the disclosure, there is provided a method performed by a server connected to a first device and a second device, including: receiving a speech input in a first language from the first device; obtaining, by using an artificial intelligence (AI) model, an estimated interpretation time that indicates a time expected to be required to interpret the speech input in the first language into a second language; transmitting, based on the estimated interpretation time, interpretation situation information to at least one of the first device or the second device; interpreting the speech input in the first language into the second language; and transmitting, to the second device a result of the interpreting of the speech input into the second language.

The AI model may include a model trained on a plurality of speech inputs in the first language and corresponding times taken to interpret the plurality of speech inputs in the first language into the second language.

The AI model may include an interpretation model configured to interpret the speech input in the first language into the second language, the interpreting may include using the interpretation model to interpret the speech input in the first language into the second language, and the method may further include: providing the estimated interpretation time to the second device; and providing the result of the interpreting of the speech input into the second language to the second device.

The estimated interpretation time may indicate an expected time from a first time point when a speaker's utterance for the speech input is finished to a second time point when reproduction of the result of the interpreting of the speech input is finished.

The interpretation situation information may include at least one of information about whether interpretation is delayed, a command for instructing an output of a notification of an interpretation situation, information about a device from which the notification of the interpretation situation is to be output, information about an accumulated delay time, information about a language for which the interpretation is delayed, or a message notifying that the interpretation is delayed.

The transmitting of the interpretation situation information may include: updating an accumulated delay time based on the estimated interpretation time; and identifying whether to transmit the interpretation situation information based on the accumulated delay time.

The method may further include: measuring an actual interpretation time from a first time point when a speaker's utterance for the speech input is finished to a second time point when reproduction of the result of the interpreting of the speech input is finished; and modifying the accumulated delay time based on a difference between the estimated interpretation time and the actual interpretation time.

The transmitting of the interpretation situation information may include: increasing an accumulated delay time by the estimated interpretation time; and transmitting the interpretation situation information to the first device based on the accumulated delay time being greater than or equal to a threshold value.

The method may further include modifying the threshold value changes based on at least one of environment information, user information, or utterance information.

The server may be connected to the second device corresponding to the second language and a third device corresponding to a third language, and transmit a result of interpreting the speech input into the third language to the third device, and the method may further include: measuring an actual interpretation time required from a first time point when a speaker's utterance for the speech input is finished to a second time point when reproduction of the result of the interpreting of the speech input into the second language is finished; decreasing or increasing an accumulated delay time by a difference between the estimated interpretation time and the actual interpretation time required; and when the interpretation of the speech input into the third language is not finished, transmitting the interpretation situation information to the second device based on the accumulated delay time.

According to embodiments of the disclosure, there is provided a server including: a communication interface configured to communicate with a plurality of devices, the plurality of devices including a first device and a second device; a memory storing one or more instructions; and a processor configured to execute the one or more instructions stored in the memory to: receive, via the communication interface, a speech input in a first language from the first device; obtain, by using an artificial intelligence (AI) model, an estimated interpretation time that indicates a time expected to be required to interpret the speech input in the first language into a second language; transmit, via the communication interface, interpretation situation information to at least one of the first device or the second device based on the estimated interpretation time; interpret the speech input in the first language into the second language; and transmit, via the communication interface, a result of the interpreting of the speech input into the second language to the second device.

The interpretation situation information may include at least one of information about whether interpretation is delayed, a command for instructing an output of a notification of an interpretation situation, information about a device from which the notification of the interpretation situation is to be output, information about an accumulated delay time, information about a language for which the interpretation is delayed, or a message notifying that the interpretation is delayed.

The processor may be further configured to execute the one or more instructions to: update an accumulated delay time based on the estimated interpretation time; and identify whether to transmit the interpretation situation information, based on the accumulated delay time.

The processor may be further configured to execute the one or more instructions to: measure an actual interpretation time from a first time point when a speaker's utterance for the speech input is finished to a second time point when reproduction of the result of the interpreting of the speech input is finished; and modify the accumulated delay time by a difference between the estimated interpretation time and the actual interpretation time.

The processor may be further configured to execute the one or more instructions to: increase an accumulated delay time by the estimated interpretation time; and transmit, via the communication interface, the interpretation situation information to the first device based on the accumulated delay time being greater than or equal to a threshold value.

The server may be connected to the second device corresponding to the second language and a third device corresponding to a third language and transmit a result of interpreting the speech input into the third language to the third device, and the processor may be further configured to execute the one or more instructions to: after transmitting the result of the interpreting of the speech input into the second language to the second device, measure an actual interpretation time required from a first time point when a speaker's utterance for the speech input is finished to a second time point when reproduction of the result of the interpreting of the speech input into the second language is finished; decrease or increase an accumulated delay time by a difference between the estimated interpretation time and the actual interpretation time required, when the interpretation of the speech input into the third language is not finished, transmit, via the communicator, the interpretation situation information to the second device based on the accumulated delay time.

According to embodiments of the disclosure, there is provided a method performed by a first device including: receiving a speech input in a first language; transmitting the speech input in the first language to a second device; receiving, from the second device, an estimated interpretation time that indicates a time expected to be required to interpret the speech input in the first language into a second language; and providing interpretation situation information to at least one of the first device or the second device based on the estimated interpretation time.

The providing of the interpretation situation information may include: increasing an accumulated delay time based on the estimated interpretation time; and outputting the interpretation situation information via an output interface of the device based on the accumulated delay time being greater than or equal to a threshold value.

The first device may be connected to the second device corresponding to the second language and a third device corresponding to a third language and transmit the speech input to the third device, and the method may further comprise: measuring an actual interpretation time from a first time point when a speaker's utterance for the speech input is finished to a second time point when reproduction of the result of the interpreting of the speech input into the second language is finished; decreasing or increasing an accumulated delay time by a difference between the estimated interpretation time and the actual interpretation time required; and when the interpretation of the speech input into the third language is not finished, transmitting the interpretation situation information to the second device based on the accumulated delay time.

Advantageous Effects of Disclosure

One or more embodiments of the disclosure, provide a speaker with information regarding interpretation progress so that the speaker does not speak too fast or too long without pausing. Thus, it is possible to prevent an excessive increase in a delay until a listener hears an interpretation result or prevent an interpretation apparatus from approaching a limit in its processing capability.

Furthermore, in a situation where many people are conversing in different languages, according to various embodiments of the disclosure, a listener may identify the progress of interpretation in a language other than a language in which an interpretation result is delivered.

MODE OF DISCLOSURE

Figure 1:
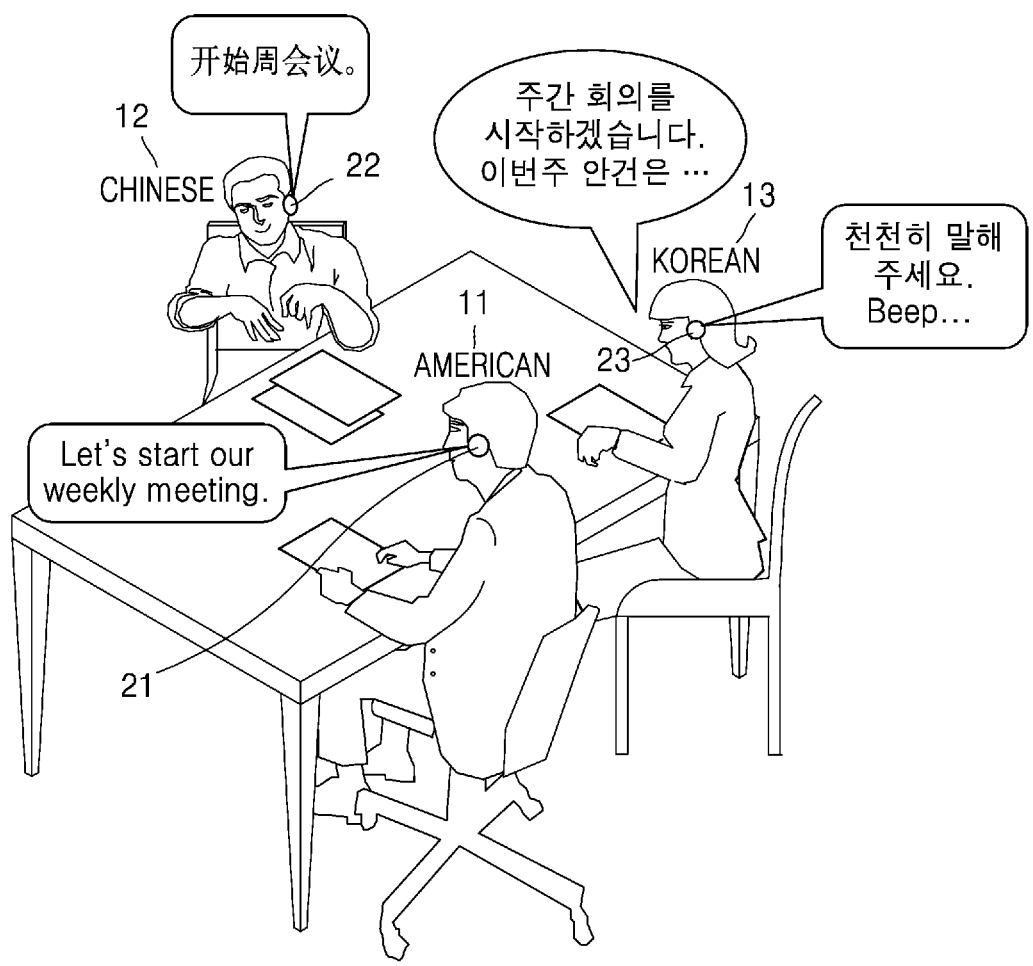
FIG. 1 is a diagram illustrating a situation where multi-party simultaneous interpretation occurs according to an embodiment.

Throughout the disclosure, the expression "at least one of a, b or c" should be understood as including only a, only b, only c, both a and b, both a and c, both b and c, or all of a, b, and c.

As used herein, general terms that are currently widely used are selected by taking functions in the disclosure into account, but the terms may have different meanings according to an intention of one of ordinary skill in the art, precedent cases, advent of new technologies, etc. Furthermore, particular terms may be arbitrarily selected by the applicant, and in this case, the meaning of the selected terms will be described in the detailed description of a corresponding embodiment. Thus, the terms used herein should be defined not by simple appellations thereof but based on the meaning of the terms together with the overall description.

Throughout the specification, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation and may be embodied as hardware or software or a combination of hardware and software.

Embodiments of the disclosure will now be described more fully hereinafter with reference to the accompanying drawings so that they may be easily implemented by those of ordinary skill in the art. However, the disclosure may have different forms and should not be construed as being limited to embodiments set forth herein. In addition, descriptions not related to embodiments of the disclosure will be omitted to clearly explain the embodiments thereof in the drawing, and like reference numerals denote like elements throughout.

Some embodiments of the disclosure may be described in terms of functional block components and various processing operations. All or some of the functional blocks may be implemented using any number of hardware and/or software components configured to perform particular functions. For example, the functional blocks of the disclosure may be implemented by one or more microprocessors or circuit components for performing predefined functions. Furthermore, for example, the functional blocks of the disclosure may be implemented with various programming or scripting languages. The functional blocks may be implemented in algorithms that run on one or more processors. Furthermore, the disclosure may employ techniques of the related art for electronics configuration, signal processing, and/or data processing.

It will be understood that, although the terms "first", "second", etc. may be used herein to describe various elements or components, the elements or components should not be limited by these terms. These terms are only used to distinguish one element or component from another element or component.

Furthermore, connecting lines or connectors shown in various figures are intended to represent example functional relationships and/or physical or logical couplings between components in the figures. In an actual device, connections between components may be represented by alternative or additional functional relationships, physical connections, or logical connections.

FIG. 1 is a diagram illustrating a situation where multi-party simultaneous interpretation occurs.

An interpretation system according to an embodiment of the disclosure may include at least one device for providing an interpretation service. The device may receive a speech input and transmit the speech input to another device and/or a server, or output a speech output obtained by interpreting the speech input.

The device for providing the interpretation service may be a stationary terminal implemented as a computer device or a portable terminal. For example, the device may be at least one of a wearable device, a head mounted display (HMD), earphones, a headset, a smartphone, a navigation device, a computer, a notebook computer, a digital broadcasting terminal, a speaker device, a personal digital assistant (PDA), a portable multimedia player (PMP), or a tablet PC, but is not limited thereto. The device may communicate with another device and/or a server via a network by using a wireless or wired communication method.

FIG. 1 illustrates an example in which devices 21, 22, and 23 that are of an earphone-type provide interpretation services. When people of various nationalities communicate in different languages, according to an embodiment of the disclosure, the devices 21, 22, and 23 provide real-time interpretation services. For example, as shown in FIG. 1, an American 11, a Chinese 12, and a Korean 13 may converse in English, Chinese, and Korean, respectively. Each of the devices 21, 22, and 23 provided to conversation participants may transmit a speech input from a corresponding conversation participant to the other devices and/or a server, or output a result of interpreting a speech input from another conversation participant into a language suitable for the conversation participant.

When a speaker (e.g., the Korean 13 in FIG. 1) speaks fast or continues speaking for a long time without pausing, a delay time may increase until a listener hears an interpretation result, and the other devices 21 and 22 may be limited in their interpretation capabilities. Thus, as shown in FIG. 1, the device 23 may output feedback (e.g., a voice notification "speak slowly," a beep sound, etc.) to alert the speaker 13 of a progress status of the interpretation so that the speaker 13 may modify a speech pattern to allow the simultaneous interpretation to proceed more smoothly.

Furthermore, according to an embodiment of the disclosure, a device may output feedback about a progress status of interpretation to a listener to prevent another listener from speaking while an interpretation result is being provided to the listener, so that the simultaneous interpretation may proceed smoothly.

Figure 2:
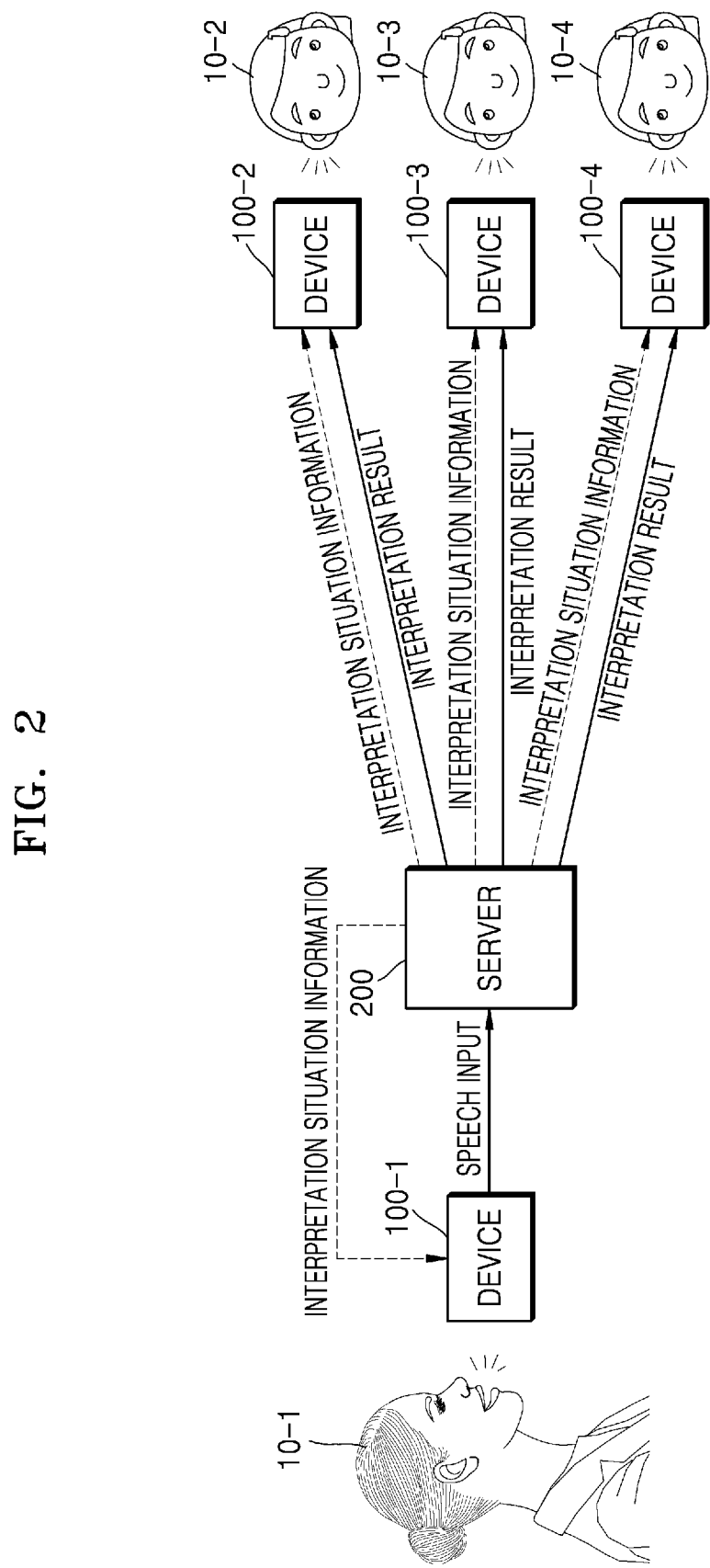
FIG. 2 illustrates a server-based interpretation system according to an embodiment of the disclosure.

FIG. 2 illustrates a server-based multilingual interpretation system according to an embodiment of the disclosure.

Referring to FIG. 2, the interpretation system according to an embodiment of the disclosure may include a plurality of devices 100-1, 100-2, 100-3, and 100-4 and a server 200. The devices 100-1, 100-2, 100-3, and 100-4 (hereinafter, also referred to as the first, second, third, and fourth devices 100-1, 100-2, 100-3, and 100-4) may be collectively referred to as a device 100. For example, the device 100 is a device capable of providing an interpretation service, and may be a smartphone, earphones, a headset, a computer, or a smart speaker having a speech input/output interface but is not limited thereto.

According to an embodiment of the disclosure, the devices 100-1, 100-2, 100-3, and 100-4 may be connected to the server 200 in a wired or wireless manner. The server 200 may share data, resources, and services with the devices 100-1, 100-2, 100-3, and 100-4, or may receive and process speech inputs from the devices 100-1, 100-2, 100-3, and 100-4 and transmit speech outputs corresponding thereto.

For example, the server 200 may be a mobile or stationary computing device, a device forming a network by connecting the devices 100-1, 100-2, 100-3, and 100-4 thereto, an edge device for processing data at an edge of the network, or a cloudlet representing a small-scale cloud datacenter.

The device 100-1 may transmit a speech input by a speaker 10-1 to the server 200. Alternatively, the device 100-1 may extract text from the speech input by the speaker 10-1 and transmit the extracted text to the server 200. Hereinafter, for convenience of description, an example in which the server 200 receives a speech input from the device 100-1 will be described. However, the disclosure is not limited to this example, and the device 100-1 may transmit a text to the server 200.

When the speaker 10-1 starts speaking, the device 100-1 may receive a speech input in a first language from the speaker 10-1 and transmit it to the server 200. According to an embodiment of the disclosure, the server 200 may receive the speech input by the speaker 10-1 and estimate the time required to interpret the speech input in the first language into a target language corresponding to each of the devices 100-2, 100-3, and 100-4. The server 200 may determine whether to provide information related to an interpretation situation, based on the estimated time required for the interpretation.

According to an embodiment of the disclosure, the server 200 may transmit the information related to the interpretation situation to at least one of the devices 100-1, 100-2, 100-3, or 100-4. For example, the server 200 may transmit interpretation situation information periodically or at a time point when a certain operation is performed. For example, the server 200 may transmit interpretation situation information to at least one device at a time point when a speech input is received, at a time point when a speaker stops an utterance for a short period of time, at the end of speech, or at a time point when an output of an interpretation result is finished.

In addition, the server 200 may interpret the speech input in the first language into a plurality of target languages and transmit corresponding results of interpretation to the devices 100-2, 100-3, and 100-4.

For example, according to an embodiment of the disclosure, when it is determined that an output of an interpretation result for a speaker's utterance is excessively delayed, the server 200 may transmit interpretation situation information to at least one device from among the devices 100-1, 100-2, 100-3, and 100-4 to notify the at least one device that the interpretation is delayed.

According to an embodiment of the disclosure, the server 200 may communicate interpretation situation information in various forms. For example, the server 200 may output a guide voice saying "The interpretation is still in progress, so please speak a little slower" to the speaker 10-1 via the device 100-1. Alternatively, for example, the server 200 may output a guide voice saying "The interpretation in another language is still in progress" to a listener via at least one device from among the devices 100-2, 100-3, and 100-4. Alternatively, for example, when an output of a result of interpretation from a first language to a second language is finished, the server 200 may communicate situation information indicating that interpretation in a third language is in progress by outputting, to a listener, a result of interpretation into a third language with the most time remaining until the interpretation is finished among interpretation operations that are still in progress. Alternatively, for example, the server 200 may communicate situation information indicating that the speaker 10 and/or listener needs to wait or no longer wait due to completion of all interpretations by outputting a beep signal via at least one device from among the devices 100-1, 100-2, 100-3, and 100-4.

FIG. 2 shows an example in which the device 100 interworks with the server 200. However, the disclosure is not limited to the illustration in FIG. 2, and the device 100 according to various embodiments of the disclosure may provide an on-device-based interpretation service without interworking with a server.

Figure 3:
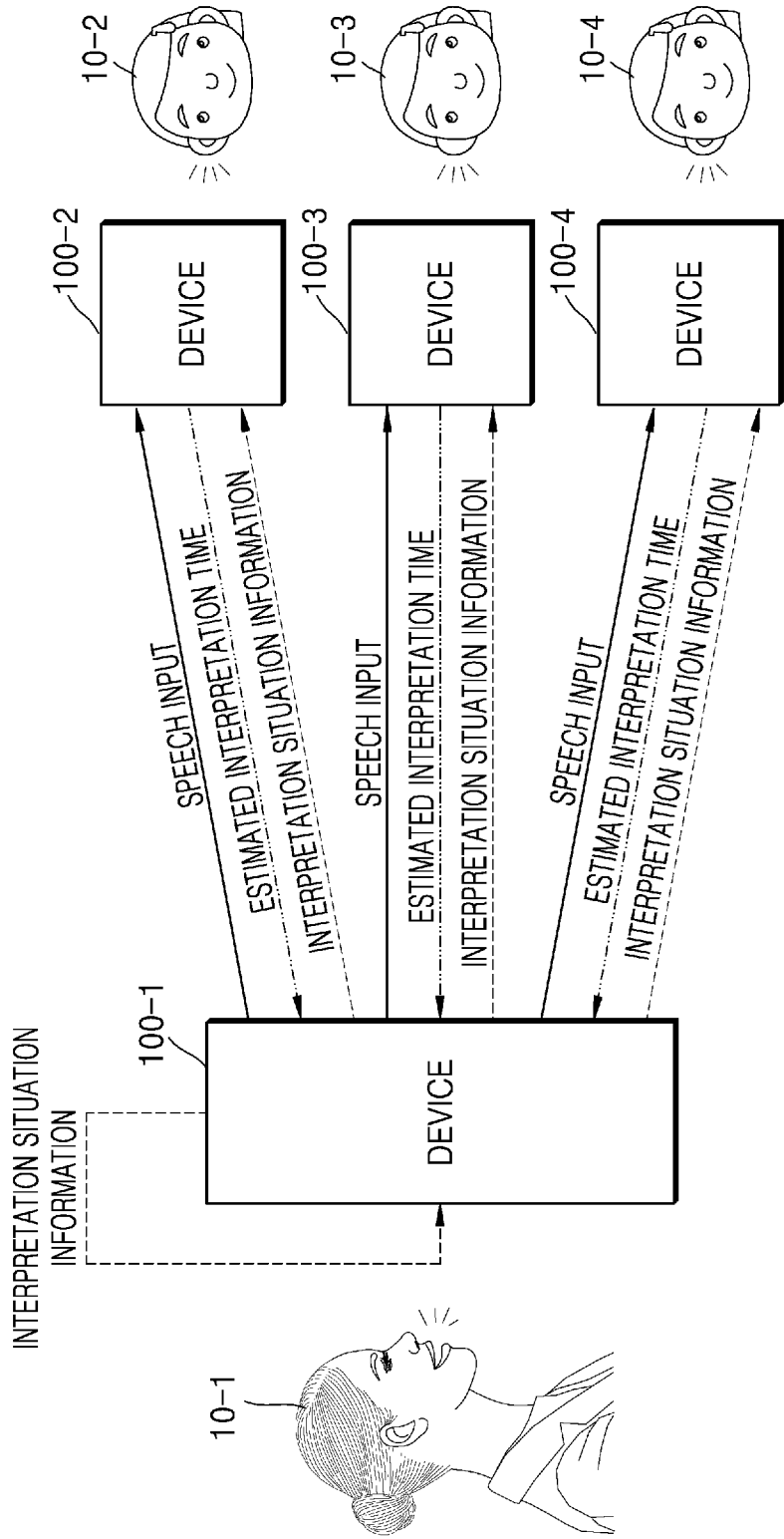
FIG. 3 illustrates an on-device interpretation system according to an embodiment of the disclosure.

FIG. 3 illustrates an on-device interpretation system according to an embodiment of the disclosure.

Referring to FIG. 3, the interpretation system according to an embodiment of the disclosure may include a plurality of devices 100-1, 100-2, 100-3, and 100-4.

According to an embodiment of the disclosure, the devices 100-1, 100-2, 100-3, and 100-4 may be connected to one another in a wired or wireless manner. The devices 100-1, 100-2, 100-3, and 100-4 may share data, resources, and services with one another.

The device 100-1 may transmit a speech input by a speaker 10-1 to the devices 100-2, 100-3, and 100-4. Alternatively, the device 100-1 may transmit, to the devices 100-2, 100-3, and 100-4, a text extracted from the speech input by the speaker 10-1.

When the speaker 10-1 starts a conversation, the device 100-1 may receive a speech input in a first language from the speaker 10-1 and transmit it to the devices 100-2, 100-3, and 100-4. According to an embodiment of the disclosure, each of the devices 100-2, 100-3, and 100-4 may receive the speech input in the first language from the device 100-1 and estimate the time required to interpret the speech input in the first language into a target language corresponding to each of the devices 100-2, 100-3, and 100-4. Each of the devices 100-2, 100-3, and 100-4 may transmit an estimated interpretation time that is a time required for interpretation to the device 100-1.

The device 100-1 that has received the estimated interpretation times may determine whether to provide information related to an interpretation situation.

According to an embodiment of the disclosure, the device 100-1 may provide the information related to the interpretation situation to at least one of the speaker 10-1, a listener 10-2, a listener 10-3, or a listener 10-4 via at least one of the devices 100-1, 100-2, 100-3, or 100-4. For example, the device 100-1 may provide interpretation situation information periodically or at a time point when a certain operation is performed.

For example, the device 100-1 may transmit interpretation situation information to at least one device at a time point when the speech input is received, at a time point when the speaker 10-1 stops an utterance for a short period of time, at the end of speech, or at a time point when an output of a result of the interpretation is finished.

According to an embodiment of the disclosure, when it is determined that an output of a result of interpretation of a speaker's utterance is excessively delayed, the device 100-1 may transmit interpretation situation information to at least one device from among the devices 100-2, 100-3, and 100-4 to notify the at least one device that the interpretation is delayed.

In addition, each of the devices 100-2, 100-3, and 100-4 may interpret the speech input in the first language into a target language corresponding thereto. The devices 100-2, 100-3, and 100-4 may respectively communicate results of the interpretation to the listeners 10-2, 10-3, and 10-4.

Hereinafter, operations of the server 200 included in the server-based multilingual interpretation system briefly described above with reference to FIG. 2 will be described in detail with reference to FIG. 4.

Figure 4:
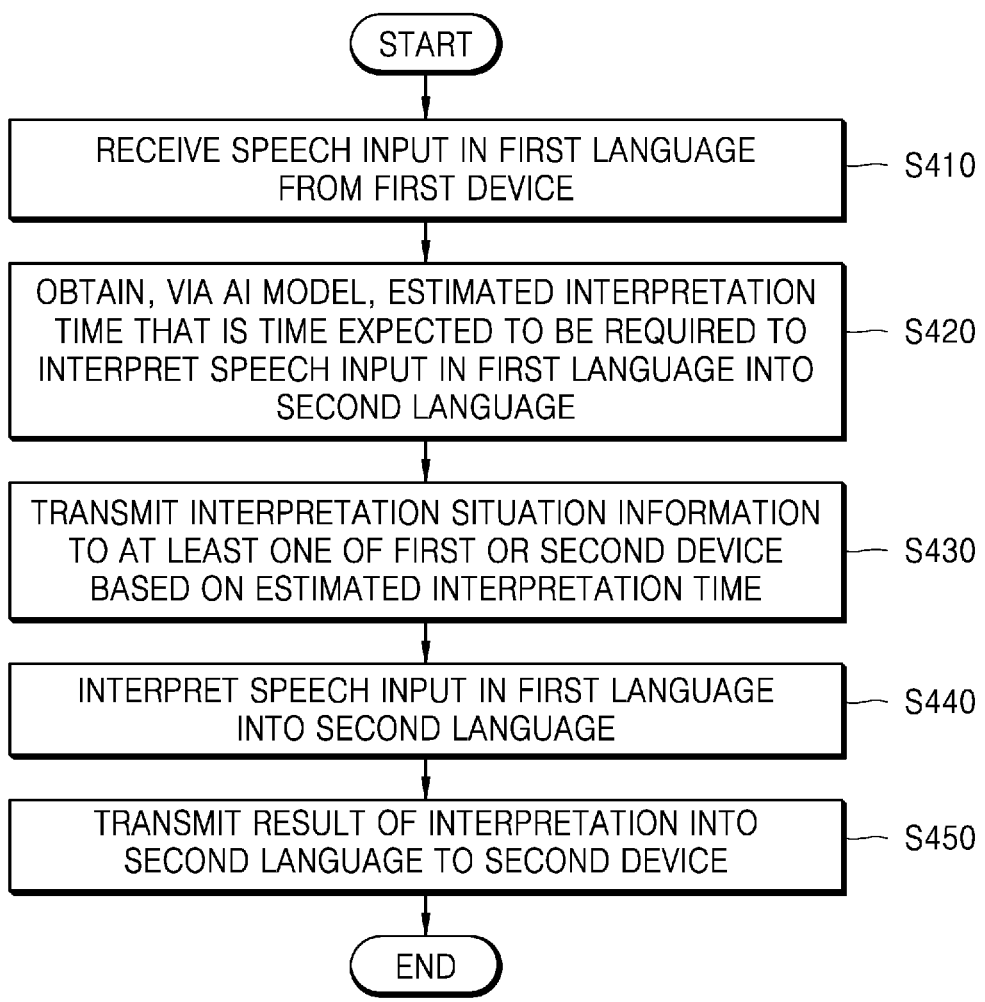
FIG. 4 is a flowchart of an operation method of a server, according to an embodiment of the disclosure.

FIG. 4 is a flowchart of an operation method of the server 200, according to an embodiment of the disclosure.

According to an embodiment of the disclosure, the server 200 may be connected to a plurality of devices in a wired or wireless manner to provide interpretation situation information. The plurality of devices may include first and second devices.

According to an embodiment of the disclosure, in operation S410, the server 200 may receive a speech input in a first language from the first device.

According to an embodiment of the disclosure, the server 200 may receive, from the first device, a speech input received via a microphone thereof.

The server 200 may receive, from the first device, the speech input including an audio signal of a speaker's utterance itself or a result of processing the utterance. For example, a result of processing a user's utterance may indicate a type of a language of the user's utterance, a feature vector extracted from the user's utterance, a text into which the user's utterance is converted, or a result output by performing natural language understanding (NLU) processing on the text. The server 200 may receive a speech input in units of frames, words, phrases, sentences, or preset time intervals.

According to an embodiment of the disclosure, in operation S420, the server 200 may obtain an estimated interpretation time that is the time expected to be required to interpret the speech input in the first language into a second language corresponding to a second device. For example, the server 200 may use an artificial intelligence (AI) model to obtain the estimated interpretation time.

According to an embodiment of the disclosure, the server 200 may obtain, as the estimated interpretation time, the expected time from a time point when the speaker's utterance for the speech input is finished to a time point when audible reproduction of a result of interpreting the speech input is finished. Alternatively, the server 200 may obtain, as the estimated interpretation time, the expected time from a time point when the speaker's utterance for the speech input is started to a time point when audible reproduction of a result of interpreting the speech input is finished, or the expected time from a time point when the speaker's utterance for the speech input is finished to a time point when audible reproduction of the result of interpreting the speech input is started.

For example, the AI model used to obtain the estimated interpretation time may be a model trained on a plurality of speech inputs in the first language and times required to interpret the speech inputs in the first language into the second language.

As another example, the AI model used to obtain the estimated interpretation time may be an interpretation model for interpreting a speech input in the first language into the second language and may output the estimated interpretation time before outputting a result of the interpretation into the second language. The AI model used to obtain the estimated interpretation time will be described in more detail below with reference to FIGS. 6 and 7.

According to an embodiment of the disclosure, in operation S430, the server 200 may transmit interpretation situation information to at least one of the first device or the second device based on the estimated interpretation time.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an accumulated delay time (ADT), information about a language for which the interpretation is delayed, or a message notifying that the interpretation is delayed.

According to an embodiment of the disclosure, the server 200 may update an ADT based on the estimated interpretation time and determine whether to transmit the interpretation situation information based on the updated ADT.

An ADT may be a delay time that is increased as speech inputs are incompletely processed and then accumulated. For example, an ADT may indicate an expected time until interpretations of all unprocessed speech inputs are performed and results of the interpretations are provided to listeners. An ADT may be a global variable commonly applied to all utterances. The ADT may decrease over time. In other words, as interpretations of unprocessed speech inputs proceed, the ADT may decrease.

According to an embodiment of the disclosure, the server 200 may increase an ADT based on the estimated interpretation time and determine to transmit the interpretation situation information when the increased ADT is greater than or equal to a threshold value. When the server 200 determines to transmit the interpretation situation information, the server 200 may transmit the interpretation situation information to the first device. For example, the threshold value may be a fixed value, but may be a value that varies based on at least one of environment information, user information, or utterance information. When the server 200 determines not to transmit the interpretation situation information, the server 200 may not transmit the interpretation situation information to the first device.

According to an embodiment of the disclosure, in operation S440, the server 200 may interpret the speech input in the first language into the second language. The server 200 may interpret, via an interpretation model, the speech input in the first language into the second language corresponding to the second device. The interpretation model may be an AI model used to interpret the speech input in the first language into the second language. The interpretation model may be trained with respect to vast amounts of first language corpus data and corresponding second language corpus data.

According to an embodiment of the disclosure, in operation S450, the server 200 may transmit a result of interpreting the speech input into the second language to the second device.

The server 200 may transmit, to the second device, a text output obtained by translating the speech input in the first language into the second language, or a speech output.

According to an embodiment of the disclosure, the server 200 may be connected to a third device as well as the first and second devices. The server 200 may provide a multilingual interpretation service for interpreting the speech input in the first language into the second language corresponding to the second device and a third language corresponding to the third device.

Moreover, according to an embodiment of the disclosure, the server 200 may transmit interpretation situation information to at least one of the first device or the second device based on an actual time required for interpretation.

For example, when the interpretation of the speech input into the second language is finished, the server 200 may measure an actual interpretation time from a time point when the speaker's utterance for the speech input is finished to a time point when audible reproduction of a result of the interpretation is finished. The server 200 may decrease or increase an ADT by a difference between the estimated interpretation time obtained in operation S420 and the measured actual interpretation time. When interpretation of the speech input into the third language is not finished (for example, when an output of a result of the interpretation into the third language is not finished), the server 200 may transmit interpretation situation information to the second device based on the ADT updated based on an actual interpretation time required.

Hereinafter, a method, performed by the server 200, of providing interpretation situation information, according to an embodiment of the disclosure, will be described in detail with reference to FIGS. 5A and 5B. An example in which a user of the first device 100-1 among the plurality of devices, i.e., the first through fourth devices 100-1, 100-2, 100-3, and 100-4, speaks while the server 200 performs interpretation of a speech input received from the first device 100-1 and transmits a result of the interpretation to the second through fourth devices 100-2, 100-3, and 100-4 will now be described with reference to FIGS. 5A and 5B.

Figure 5A:
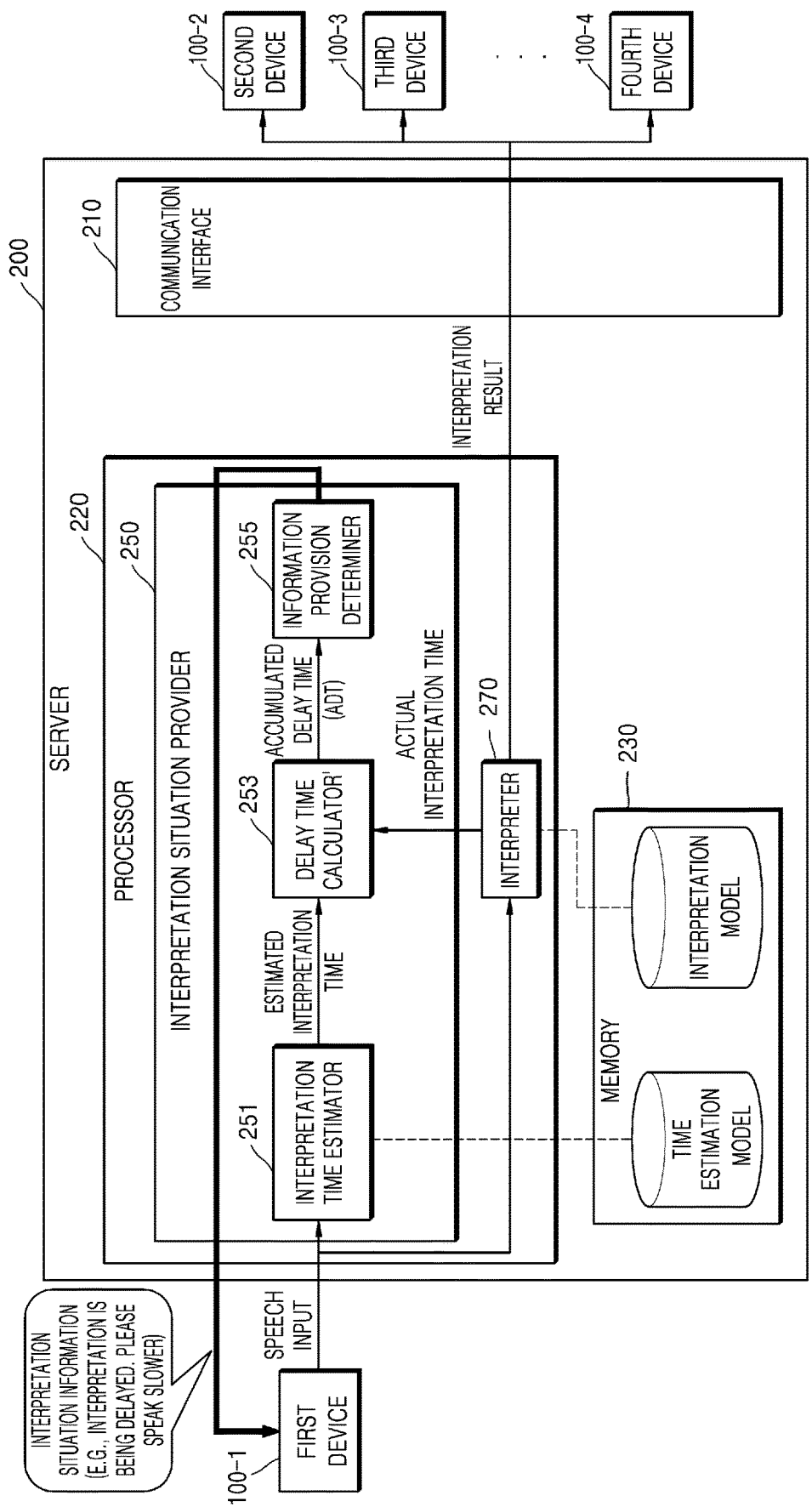
FIG. 5A is a detailed block diagram of a server-based interpretation system according to an embodiment of the disclosure.
Figure 5B:
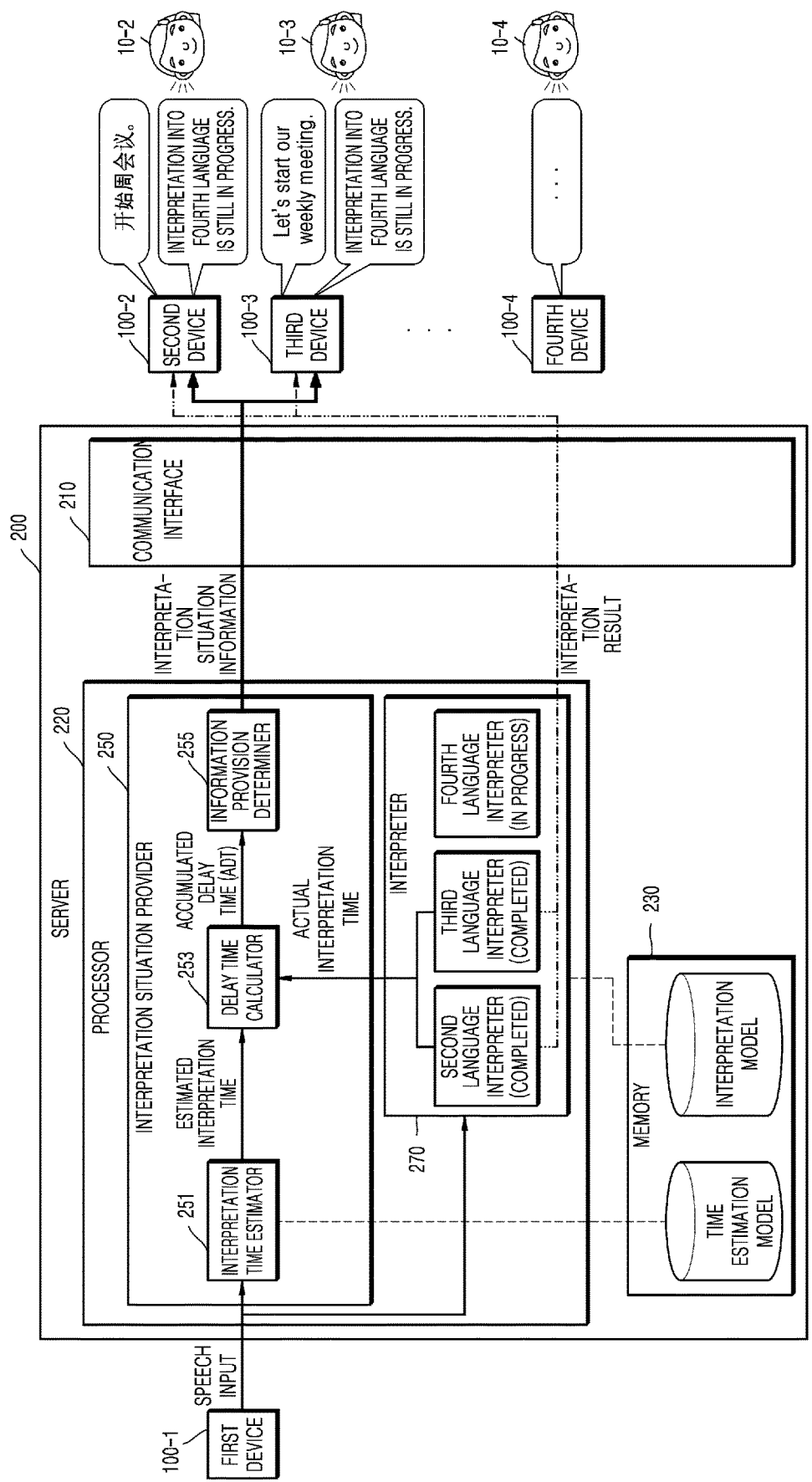
FIG. 5B is a detailed block diagram of a server-based interpretation system according to an embodiment of the disclosure.

However, the disclosure is not limited thereto, and an interpretation system according to an embodiment of the disclosure may include fewer or more devices than the illustrations in FIGS. 5A and 5B. Furthermore, when a user of one of the second through fourth devices 100-2, 100-3, and 100-4 other than the first device 100-1 speaks, the server 200 may receive a speech input from the corresponding device and transmit interpretation results to the other devices. For example, when a user of the second device 100-2 makes an utterance, the server 200 receives a speech input from the second device 100-2 and transmits interpretation results to the first device 100-1, the third device 100-3, and the fourth device 100-4. Hereinafter, a device that has received an interpretation result may be referred to as a target device.

FIG. 5A is a detailed block diagram of a server 200 according to an embodiment of the disclosure.

According to an embodiment of the disclosure, a first device 100-1 may receive an utterance of a speaker speaking in a first language via a microphone. For example, the first device 100-1 may receive and process an utterance in units of frames, or detect the presence or absence of a human speech by using voice activation detection (VAD) or end point detection (EPD) and receive and process an utterance in units of sentences. Alternatively, the first device 100-1 may detect an intent of the utterance and receive and process the utterance in units of words, phrases, or sentences.

The first device 100-1 may transmit a speech input to the server 200 based on the speaker's utterance. The "speech input" may include an audio signal of the speaker's utterance itself or a result of processing the utterance. For example, a result of processing a user's utterance may include a feature vector extracted from the user's utterance, a text into which the user's utterance is converted, or a result output by performing NLU processing on the text. The first device 100-1 may transmit, to the server 200, a speech input in units of words, phrases, sentences, or preset time intervals.

An interpretation situation provider 250 of a processor 220 of the server 200 may determine whether to provide interpretation situation information to the first device 100-1 based on the received speech input.

An interpretation time estimator 251 of the interpretation situation provider 250 may estimate, by using a time estimation model stored in a memory 230, times taken to interpret the speech input in the first language into target languages respectively corresponding to target devices, i.e., second through fourth devices 100-2, 100-3, and 100-4. For example, the interpretation time estimator 251 may estimate a time required to interpret the speech input in the first language into a second language corresponding to the second device 100-2 and a time required to interpret the speech input in the first language into a third language corresponding to the third device 100-3.

A time required for interpretation may refer to a time from a time point when the speaker's utterance for the speech input is finished to a time point when audible reproduction of a result of interpreting the speech input is finished. However, the disclosure is not limited thereto, and the time required for the speaker to make an utterance for the speech input may also be included in the time required for interpretation. In other words, the time required for interpretation may refer to a time point when the utterance for the speech input is started to a time point when an output of the result of interpreting the speech input is finished.

According to an embodiment of the disclosure, the interpretation time estimator 251 may estimate the required interpretation time by using a pre-trained time estimation model. Although FIG. 5A shows that the time estimation model is separate from an interpretation model, according to an embodiment of the disclosure, the interpretation time estimator 251 may obtain, without using a separate time estimation model, an estimated interpretation time from the interpretation model as an intermediate output result before obtaining an interpretation result.

For example, the time estimation model may perform learning for estimating an interpretation time by using data (e.g., a parallel corpus) used for interpretation or translation training. For training of the time estimation model, speech inputs, target languages, and an actual time required for interpretation may be used. The time estimation model may estimate the required interpretation time even for an unlearned speech input by learning a vast amount of corpus data.

According to an embodiment of the disclosure, a delay time calculator 253 of the server 200 may calculate an ADT based on the estimated interpretation time. The ADT is a delay time that is increased as continuously received speech inputs are incompletely processed and then accumulated, and may indicate a time that is expected to be required until interpretations of the incompletely processed speech inputs are finished. The ADT may be a variable commonly applied to all utterances as a global variable.

The ADT may decrease over time. In other words, as interpretations of unprocessed speech inputs proceed, the ADT may decrease.

According to an embodiment of the disclosure, the delay time calculator 253 may update a previously calculated ADT based on an estimated interpretation time.

For example, when a speech input is newly received, the delay time calculator 253 may increase the ADT by an estimated interpretation time for the corresponding speech input because interpretation of the speech input needs to be performed.

According to an embodiment of the disclosure, an ADT may be a variable commonly applied for a plurality of target languages. For example, when the server 200 needs to interpret the speech input into a plurality of target languages, the delay time calculator 253 may increase an ADT by a longest estimated interpretation time among estimated interpretation times corresponding to the target languages. For example, the server 200 may determine, based on the ADT updated by the delay time calculator 253 of the server 200, a time expected to be required to complete interpretations of the speech input in the first language into the target languages.

According to another embodiment of the disclosure, an ADT may be a variable applied individually to each target language. For example, when the server 200 needs to interpret a speech input into a plurality of target languages, the delay time calculator 253 may individually increase an ADT associated with each target language by an estimated interpretation time for the corresponding target language. For example, the server 200 determines, based on the ADT updated by the delay time calculator 253, when interpretation into each target language is to be completed and which target language is used for the currently uncompleted interpretation.

According to an embodiment of the disclosure, the information provision determiner 255 of the server 200 may determine whether to transmit interpretation situation information to the first device 100-1 based on the ADT updated by the delay time calculator 253.

When the ADT is greater than or equal to a threshold value, the information provision determiner 255 may determine that an output of an interpretation result for the speaker's utterance is excessively delayed. The information provision determiner 255 may determine to transmit, to the first device 100-1, interpretation situation information indicating that the output of the interpretation result is delayed based on the ADT being greater than or equal to the threshold value.

The threshold value taken into account by the information provision determiner 255 to determine whether to transmit the interpretation situation information may be a fixed value, or may be a value that varies based on environment information, user information, utterance information, etc.

For example, the threshold value for determining whether the output of the interpretation result is delayed may vary according to the number of accumulated speech inputs (e.g., words, phrases, or sentences). For example, the information provision determiner 255 may identify the threshold value.

For example, when the speaker's utterance is of a short length and thus a small number of speech inputs are accumulated, such as in a situation where greetings are exchanged, a listener may expect an interpretation result to be output relatively fast. Therefore, when a small number of speech inputs are accumulated, the threshold value may be determined to be low. On the other hand, when the speaker's utterance is of a long length and a large number of speech inputs are accumulated, such as in an address or lecture, a listener has no problem in understanding information even when an interpretation result is output after a lapse of a relatively long delay time. Thus, as the number of accumulated speech inputs increases, the threshold value may be set to be high.

As another example, the threshold value for determining whether the output of the interpretation result is delayed may be set differently based on a network situation, an utterance situation, or the like.

Referring to FIG. 5A, according to an embodiment of the disclosure, when the speaker speaks fast or continues speaking for a long time without pausing, so that incompletely processed speech inputs are accumulated, the information provision determiner 255 of the server 200 may determine that the ADT calculated by the delay time calculator 253 is greater than or equal to the threshold value. When the ADT is greater than or equal to the threshold value, the information provision determiner 255 of the server 200 may determine that the interpretation situation information should be transmitted.

According to an embodiment of the disclosure, when the information provision determiner 255 determines to transmit the interpretation situation information, the server 200 may transmit the interpretation situation information to the first device 100-1 via the communication interface 210.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an ADT, information about a language for which the interpretation is delayed, or a message notifying that the interpretation is delayed.

The server 200 may transmit, via the first device 100-1, feedback "The interpretation is being delayed. Please speak a little slower," to the speaker as interpretation situation information. As shown in FIG. 5A, the interpretation system according to an embodiment of the disclosure may guide the speaker to decrease a speed of an utterance or stop the utterance for a short period of time by transmitting the interpretation situation information to the speaker. When the speaker decreases the speed of an utterance or stops the utterance for a short period of time, the server 200 may secure a time for finishing interpretations that have been delayed.

An interpreter 270 of the processor 220 of the server 200 may interpret the speech input in the first language into a plurality of target languages. According to an embodiment of the disclosure, the interpreter 270 may perform interpretation in units of sentences or end of speech (EoS). However, the disclosure is not limited to this embodiment of the disclosure, and the server 200 may perform interpretation in smallest semantic units (e.g., words, phrases, or sentences) capable of distinguishing the meaning and output a result of the interpretation.

For example, the server 200 may receive in real-time a speech input in units of frames, and output a result of performing interpretation in smallest semantic units. The server 200 may accumulate and store continuously received speech inputs, and when the accumulated speech inputs constitute a smallest semantic unit, the server 200 may provide an interpretation result by interpreting the accumulated speech inputs.

The server 200 may transmit, via the communication interface 210, interpretation results to the second through fourth devices 100-2, 100-3, and 100-4. For example, the second through fourth devices 100-2, 100-3, and 100-4 may respectively receive interpretation results in different target languages.

According to an embodiment of the disclosure, the server 200 may perform interpretation by using a AI model (e.g., a translation model or an interpretation model) pre-trained to perform interpretation. The interpretation model may be an AI model separate from the time estimation model or that is capable of obtaining an estimated interpretation time as an intermediate output result before obtaining an interpretation result.

For example, the server 200 may perform interpretation by converting the speech input in the first language into a text, translating the text in the first language into a text in a second language by using a translation model, and converting the text in the second language back into a speech. For interpretation, the server 200 may use multiple models such as a speech to text (STT) model, a translation model (a text to text model), and/or a text to speech (TTS) model.

As another example, the server 200 may use the interpretation model that interprets the speech input in the first language into the second language in an end-to-end manner. An end-to-end method is an interpretation method using a deep neural network trained to directly map the speech input in the first language to a speech output in the second language. The end-to-end method may use a single trained deep neural network, as compared to other interpretation methods using multiple models. According to an embodiment of the disclosure, the translation model may be a model that receives a text in the first language and outputs a text in the second language, and the interpretation model may be a model that receives a speech in the first language and outputs a speech in the second language.

An "interpretation result" transmitted from the server 200 to each of the second through fourth devices 100-2, 100-3, and 100-4 may include a text obtained by translating the speech input in the first language (a type of a language of the speaker's utterance) into a target language, or a speech output in the target language.

Moreover, the disclosure is not limited to an embodiment in which feedback is provided only to the speaker as illustrated in FIG. 5A, and may include an embodiment in which interpretation situation information related to a language other than a target language of a listener is provided to a listener. Hereinafter, a method, performed by the server 200, of providing interpretation situation information, according to an embodiment of the disclosure, will be described with reference to FIG. 5B.

FIG. 5B is a detailed block diagram of a server 200 according to an embodiment of the disclosure.

According to an embodiment of the disclosure, a first device 100-1 may receive an utterance of a speaker speaking in a first language via a microphone. The first device 100-1 may transmit a speech input to the server 200 based on the speaker's utterance. The first device 100-1 may transmit, to the server 200, a speech input in units of words, phrases, sentences, or preset time intervals.

An interpretation situation provider 250 of a processor 220 of the server 200 may determine whether to provide interpretation situation information to at least one of the second device 100-2, the third device 100-3, or the fourth device 100-4 based on the received speech input.

An interpretation time estimator 251 of the interpretation situation provider 250 may estimate, by using a time estimation model stored in a memory 230, times taken to interpret the speech input in the first language into target languages respectively corresponding to target devices, i.e., second through fourth devices 100-2, 100-3, and 100-4.

According to an embodiment of the disclosure, a delay time calculator 253 may update a previously calculated ADT based on at least one of an estimated interpretation time or an actual interpretation time required.

First, when a speech input is newly received, the delay time calculator 253 may increase an ADT by an estimated interpretation time for the corresponding speech input because interpretation of the speech input needs to be performed.

According to an embodiment of the disclosure, the ADT may be a variable commonly applied to a plurality of target languages. For example, when the server 200 needs to interpret the speech input into a plurality of target languages, the delay time calculator 253 may increase an ADT by a longest estimated interpretation time among estimated interpretation times corresponding to the target languages. For example, the server 200 may determine, based on the ADT updated by the delay time calculator 253 of the server 200, a time expected to be required to complete interpretations of the speech input in the first language into all the target languages.

According to another embodiment of the disclosure, an ADT may be a variable applied individually to each target language. For example, when the server 200 needs to interpret a speech input into a plurality of target languages, the delay time calculator 253 may individually increase an ADT associated with each target language by an estimated interpretation time for the corresponding target language. For example, the server 200 may determine, based on the ADT updated by the delay time calculator 253, when interpretation into each target language is to be completed and which target language is used for the currently uncompleted interpretation.

Then, when interpretation is completed, the delay time calculator 253 may update the ADT based on the estimated interpretation time and actual interpretation time required. When interpretation of a speech input is finished, the delay time calculator 253 may update an ADT based on a result of comparing the actual interpretation time required with the estimated interpretation time that is the time expected for the speech input. When the actual interpretation time required is shorter than the estimated interpretation time, the ADT may be shortened, and when the actual interpretation time is longer than the estimated interpretation time, the ADT may be increased.

According to an embodiment of the disclosure, the information provision determiner 255 of the server 200 may determine, based on the ADT, whether to transmit interpretation situation information to at least one of the second device 100-2, the third device 100-3, or the fourth device 100-4.

After interpretations in some of the target languages are finished, the information provision determiner 255 may determine, based on the ADT, whether an output of interpretation results for the remaining target languages is delayed. When the information provision determiner 255 determines that the output of the interpretation results for the remaining target languages is excessively delayed, the information provision determiner 255 may provide interpretation situation information indicating the excessive delay to a device for which interpretation is completed.

According to an embodiment of the disclosure, when interpretation in at least one target language among the target languages is finished, the interpretation situation provider 250 may update the ADT based on estimated interpretation time and actual interpretation time required. When the updated ADT is greater than or equal to a threshold value, the interpretation situation provider 250 may determine that an output of an interpretation result for the speaker's utterance is excessively delayed. Thus, the interpretation situation provider 250 may determine to transmit, to at least one device, interpretation situation information indicating that an output of an interpretation result in another language is delayed.

FIG. 5B illustrates an example in which an interpreter 270 of the server 200 according to an embodiment of the disclosure includes a second language interpreter for interpreting the speech input into a second language understandable by a listener 10-2 using the second device 100-2, a third language interpreter for interpreting the speech input into a third language understandable by a listener 10-3 using the third device 100-3, and a fourth language interpreter for interpreting the speech input into a fourth language understandable by a listener 10-4 using the fourth device 100-4.

According to an embodiment of the disclosure, when interpreting the speech input in the first language into a target language, the interpreter 270 may convert the speech input in the first language into a speech output in the target language in units of sentences or EoS. The interpreter 270 may accumulate and store speech outputs obtained by converting continuously received speech inputs, and when the accumulated speech outputs constitute a certain unit (e.g., a word, a phrase, a minimal semantic unit, or sentence), the server 200 may provide the accumulated speech outputs to the device 100.

Referring to FIG. 5B, the second and third language interpreters may respectively transmit interpretation results obtained by completing interpretations to the second and third devices 100-2 and 100-3. The second and third devices 100-2 and 100-3 respectively output the interpretation results received from the server 200 to the listeners 10-2 and 10-3. According to an embodiment of the disclosure, when an interpreter for a certain target language has completed interpretation, it may be understood that an operation of converting the speech input into a speech output in the corresponding target language is completed.

For example, because the amount of time required for interpretation may vary depending on a type of a target language, the second and third language interpreters may have completed interpretations of the speech input while the fourth language interpreter may be in the process of interpreting the speech input. Alternatively, although interpretations into all the target languages have been completed and the interpretation results obtained from the second and third language interpreters have been respectively output to the listeners 10-2 and 10-3, an output of an interpretation result from the fourth language interpreter to the listener 10-4 may not have started or be still in progress.

When it takes longer to interpret the speech input into the fourth language than into the second and third languages, the interpretation situation provider 250 of the server 200 may transmit, as interpretation situation information, feedback of "Interpretation in the fourth language is being delayed" to the listeners 10-2 and 10-3 using the second and third devices 100-2 and 100-3.

As shown in FIG. 5B, the second and third devices 100-2 and 100-3 that have received the interpretation situation information after outputting the corresponding interpretation results may respectively output the interpretation situation information to the listeners 10-2 and 10-3. For example, the second and third devices 100-2 and 100-3 may output interpretation situation information indicating interpretation into the fourth language is still in progress.

An interpretation system according to an embodiment of the disclosure may guide a listener to make an utterance after waiting for a certain period of time by transmitting the interpretation situation information to the listener. Thus, while the listener is waiting, the server 200 may secure a time for finishing interpretations that have been delayed.

Hereinafter, an example of an AI model used to obtain an estimated interpretation time according to an embodiment of the disclosure will be described with reference to FIGS. 6 and 7.

Figure 6:
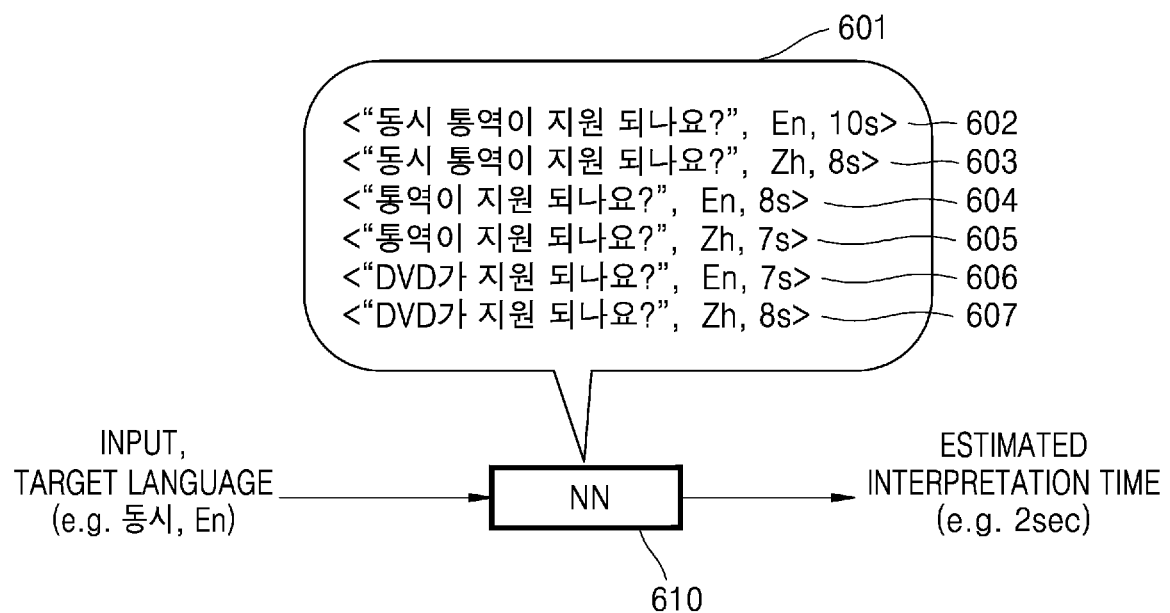
FIG. 6 illustrates an example of a time estimation model according to an embodiment of the disclosure.

FIG. 6 illustrates an example of a time estimation model according to an embodiment of the disclosure.

The time estimation model according to an embodiment of the disclosure may be an AI model trained separately to estimate the time required for interpretation. Data (e.g., a corpus) used to train the time estimation model may be constructed using a parallel corpus used for interpretation/translation training. For example, the time estimation model may be trained using an input of a source language, a target language, and a time required taken to interpret the source language into the target language.

The trained time estimation model may receive a speech input in a source language and a target language as inputs, and output an estimated interpretation time. The time estimation model may estimate the required interpretation time even for an unlearned speech input by learning a vast amount of corpus data.

FIG. 6 shows a time estimation model 610 trained with respect to training corpora 601. The training corpora 601 may be configured in a format of <input, target language, required interpretation time>.

A corpus 602 included in the training corpus 601 includes information indicating that it takes 10 seconds to interpret a Korean input "동시 통역이 " 지원되나요? ?" ("Is simultaneous interpretation supported?" in English) into English (En), and a corpus 603 includes information indicating that it takes 8 seconds to interpret the Korean input into Chinese (Zh). In addition, a corpus 604 includes information indicating that it takes 8 seconds to interpret a Korean input " "통역이지 원되나요?" " ("Is interpretation supported?" in English) into English (En), and a corpus 605 includes information indicating that it takes 7 seconds to interpret the Korean input into Chinese (Zh). In addition, a corpus 606 includes information indicating that it takes 7 seconds to interpret a Korean input "DVD 가지원 되나요? ?" ("Is DVD supported?" in English) into English (En), and a corpus 607 includes information indicating that it takes 8 seconds to interpret the Korean input into Chinese (Zh).

The time estimation model 610 whose training on the training corpora 601 is completed may estimate the time required for interpretation of an unlearned input text.

For example, the time estimation model 610 may estimate that it takes 2 seconds to interpret a word ""동시" " into an English word "simultaneous" by learning the corpora 602 and 604. Furthermore, the time estimation model 610 may estimate that it takes 1 second to interpret the word ""동시" " ("simultaneous" in English) into a Chinese word "" 同時" " by learning the corpora 603 and 605.

In addition, for example, by learning the training corpora 601, the time estimation model 610 may estimate the time required to interpret a word ""통역" " into English to be 1 second longer than the time required taken to interpret the word ""통역" " into Chinese. The time estimation model 610 may also estimate the time required to interpret the word "DVD" into English to be 1 second shorter than the time required to interpret "DVD" into Chinese.

Moreover, according to an embodiment of the disclosure, the time estimation model 610 may be a model for estimating and informing an interpretation time within the interpretation model.

Figure 7:
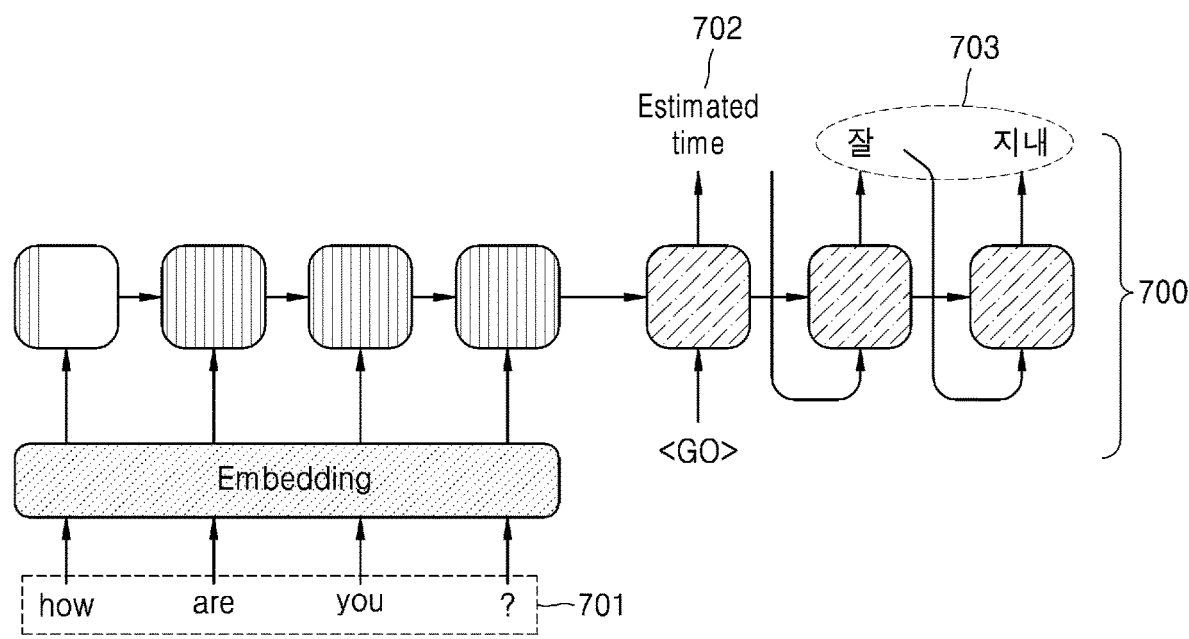
FIG. 7 illustrates an example of an interpretation model for estimating an interpretation time, according to an embodiment of the disclosure.

FIG. 7 illustrates an example of an interpretation model for estimating an interpretation time, according to an embodiment of the disclosure.

A schematic diagram 700 of FIG. 7 illustrates an example of an interpretation model for interpreting English into Korean. As shown in FIG. 7, the interpretation model according to an embodiment of the disclosure may be trained to output an estimated interpretation time 702 before outputting an interpretation result 703 obtained by interpreting an input 701 in a source language into a target language.

Hereinafter, a detailed method, performed by the server 200, of providing interpretation situation information, according to an embodiment of the disclosure, will be described with reference to FIGS. 8 through 11.

Figure 8:
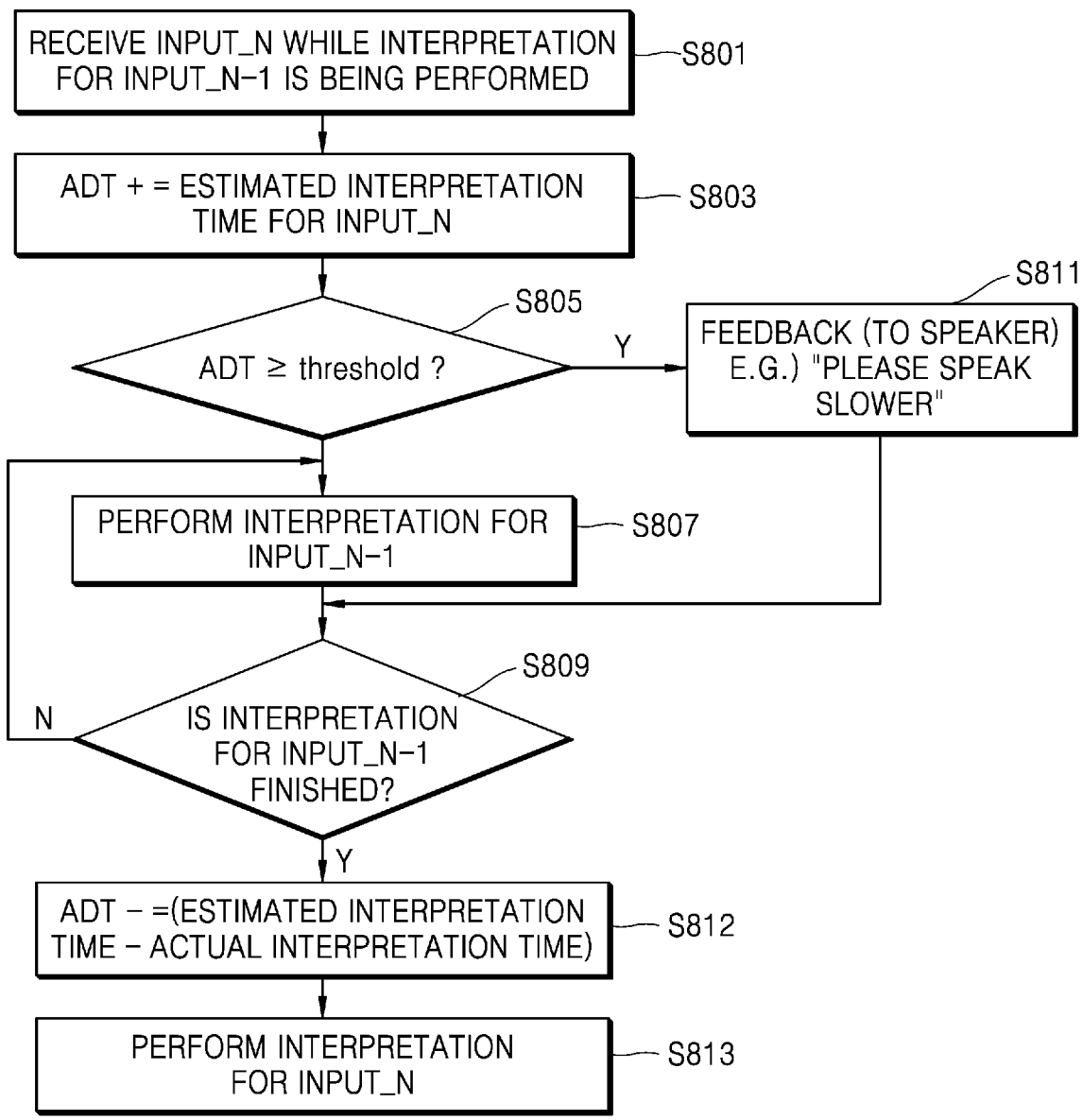
FIG. 8 is a flowchart of a method, performed by a server, of determining whether to provide interpretation situation information, according to an embodiment of the disclosure.

FIG. 8 is a flowchart of a method, performed by the server 200, of determining whether to provide interpretation situation information, according to an embodiment of the disclosure.

FIG. 8 illustrates an example in which the server 200 sequentially receives speech inputs from a first device in smallest units that are capable of performing interpretation (e.g., in units of words, phrases, or sentences). However, the disclosure is not limited to the example shown in FIG. 8, and the server 200 may receive a speech input in units of frames and store the received speech input in a buffer. For example, when a plurality of frames are accumulated, the server may perform operations of FIG. 8 with respect to frames that are in units of words, phrases, sentences, or preset time intervals.

In operation S801, the server 200 may receive an n-th speech input Input_n from a first device while interpretation for an n-1-th speech input Input_n-1 is in progress. When an n-th speech input Input_n is received, in operation S803, the server 200 may obtain an estimated interpretation time for the n-th speech input Input_n, and increase an ADT by the estimated interpretation time.

In operation S805, the server 200 may determine whether the ADT updated in operation S803 is greater than or equal to a threshold value. When the ADT is greater than or equal to the threshold value, in operation S811, the server 200 may determine that the ADT is excessively increased and determine to transmit, to a speaker, interpretation situation information indicating that an output of an interpretation result is delayed. For example, the server 200 may transmit, as interpretation situation information, feedback "Please speak a little slower" to the speaker via the first device.

On the other hand, when the ADT is less than the threshold value, the server 200 may determine not to transmit separate interpretation situation information to the speaker, and perform operation S807. The server 200 may continue to perform interpretation for the n-1-th speech input Input_n-1 in operation S807, and determine whether the interpretation for the n-1-th speech input Input_n-1 is finished in operation S809.

When the interpretation for the n-1-th speech input Input_n-1 is finished, in operation S812, the server 200 may subtract a difference between the estimated interpretation time and an actual interpretation time required from the ADT. Subsequently, in operation S813, the server 200 may perform interpretation for the n-th speech input Input_n.

Figure 9:
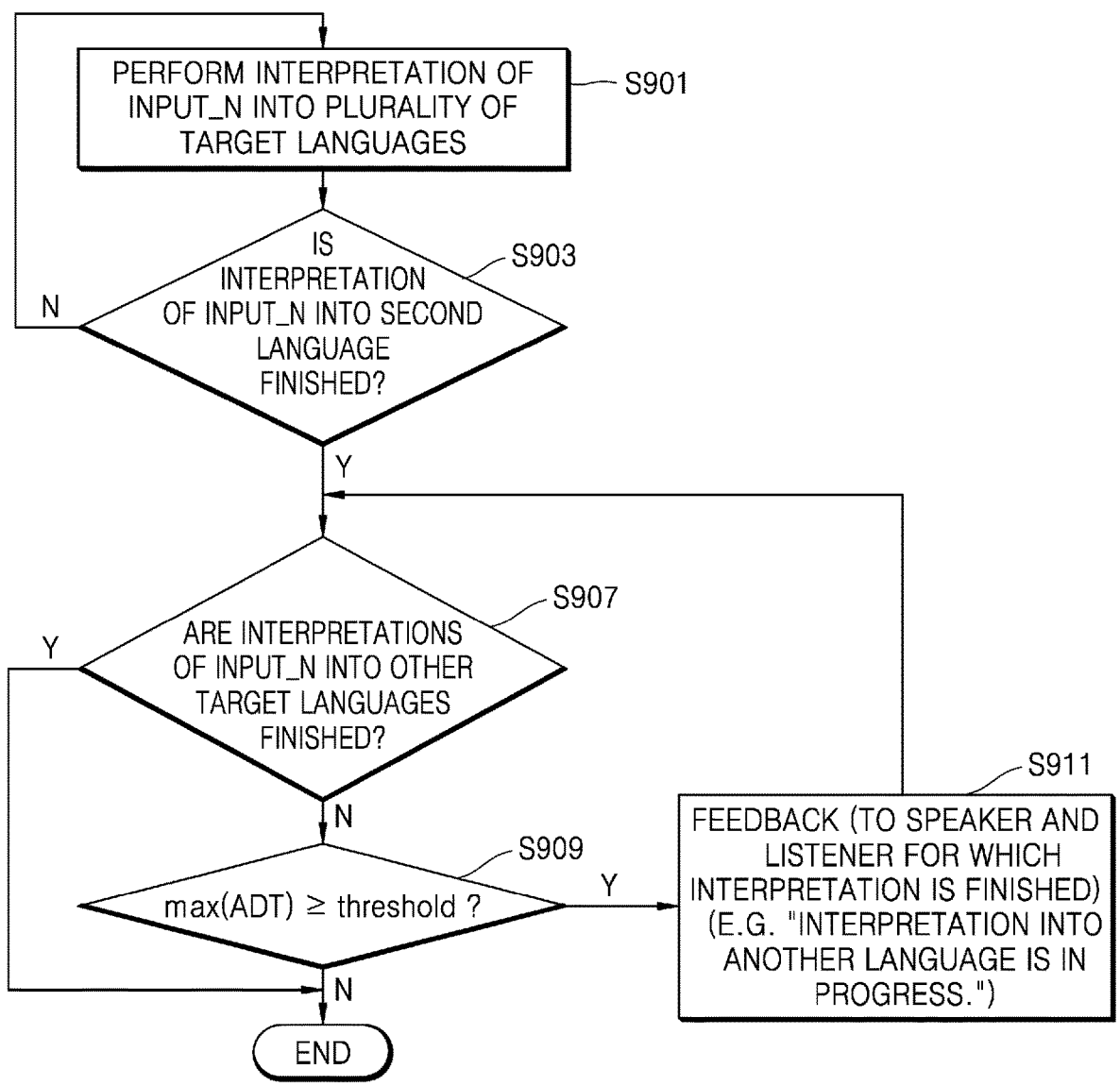
FIG. 9 is a flowchart of a method, performed by a server, of determining whether to provide interpretation situation information, according to an embodiment of the disclosure.

FIG. 9 is a flowchart of a method, performed by the server 200, of determining whether to provide interpretation situation information, according to an embodiment of the disclosure.

FIG. 9 illustrates an example in which the server 200 sequentially receives the speech input of the first language from the first device in smallest units that are capable of performing interpretation (e.g., in units of words, phrases, or sentences). However, the disclosure is not limited to the example shown in FIG. 9, and the server 200 may receive a speech input in units of frames and store the received speech input in a buffer. For example, when a plurality of frames are accumulated, the server 200 may perform the operations of FIG. 8 with respect to frames in units of words, phrases, sentences, or preset time intervals.

FIG. 9 illustrates an example in which the server 200 interprets the n-th speech input Input_n into a plurality of target languages and outputs the interpretation results via a plurality of target devices. For example, the server 200 may output, to a second device, a result of interpreting a speech input in a first language, which is received from a first device, into a second language, and output a result of interpretation into a third language to a third device. The target languages may include the second and third languages, etc. and the target devices may include the second and third devices, etc.

According to an embodiment of the disclosure, the server 200 may manage a plurality of ADT variables individually applied to the target languages. By performing interpretation, the server 200 may obtain an estimated interpretation time for each of the target languages. The server 200 may increase an ADT for each target language by an estimated interpretation time for the corresponding target language. For example, the server 200 may manage an ADT variable $ADT_1$ applied to the second language and an ADT variable $ADT_2$ applied to the third language.

In operation S901, the server 200 may perform interpretations of an n-th speech input Input_n into a plurality of target languages. For example, a time required for interpretation may vary depending on a type of a target language. For example, a processing time, which is taken from a time point when an utterance for a speech input is finished to a time point when an interpretation result for the speech input is obtained, and a playback time required to output the interpretation result in the form of a speech may vary depending on a type of a target language.

In operation S903, the server 200 may determine whether interpretation into at least one target language among the target languages, i.e., a second language, is finished. For example, the server 200 may receive, from a target device, information indicating that an output of an interpretation result is finished or information about the time required to play back the interpretation result. The server 200 may determine, based on the received information, whether interpretation into a target language is finished.

When the interpretation into the second language is finished, the server 200 may subtract, from the ADT variable $ADT_1$, a difference between an estimated interpretation time for the second language and an actual time required for the interpretation into the second language. When the interpretation into the second language is finished and there is no more uninterpreted speech input, the difference between the estimated interpretation time for the second language and the actual interpretation time for the second language may be subtracted from the ADT variable $ADT_1$, so that the ADT variable $ADT_1$ may have a value of zero. In operation S907, the server 200 may determine whether the n-th speech input Input_n for a target language other than the second language is finished.

When the n-th speech input Input_n into the other target language has not ended, in operation S909, the server 200 may determine whether an ADT for the other target language is greater than or equal to a threshold value. When the ADT is greater than or equal to the threshold value, in operation S911, the server 200 may determine that the ADT is excessively increased, and transmit interpretation situation information indicating that an output of the interpretation result is delayed to a listener for which the interpretation is completed (i.e., a listener who has been listening to the interpretation result for the second language via the second device).

According to an embodiment of the disclosure, when interpretations into the target languages are in progress, the server 200 may determine whether a value of a maximum ADT variable max (ADT) from among a plurality of ADT variables (e.g., $ADT_2$, $ADT_3$, etc.) for the target languages is greater than or equal to a threshold value. When the value of the maximum ADT variable max (ADT) is greater than or equal to the threshold value, in operation S911, the server 200 may determine that the ADT is excessively increased, and transmit interpretation situation information indicating that an output of the interpretation result is delayed to a listener for which the interpretation is completed (i.e., the listener who has been listening to the interpretation result for the second language via the second device).

For example, the server 200 may transmit, as interpretation situation information, feedback of "Interpretation into the third language is in progress" to the listener via the second device.

Figure 10:
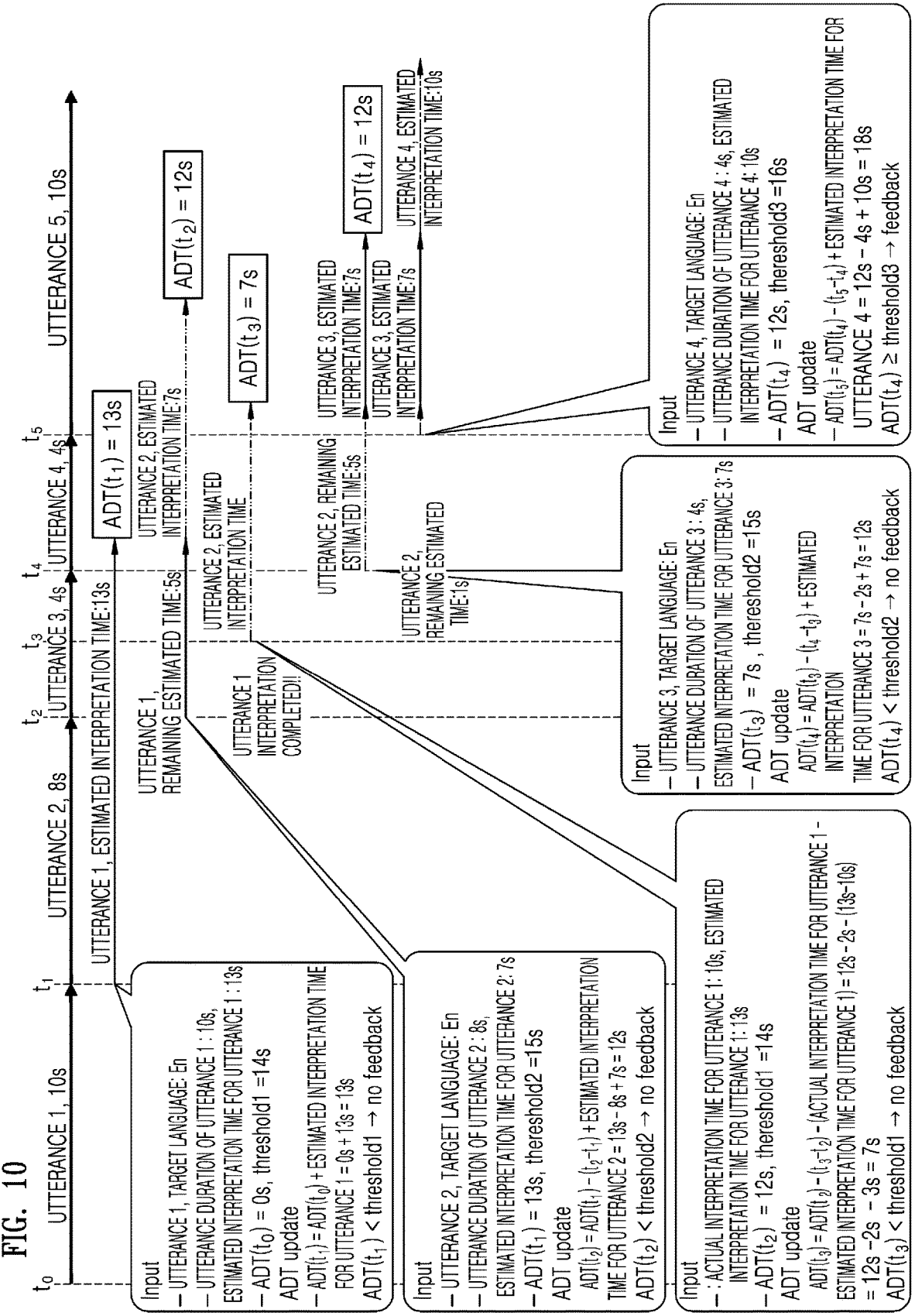
FIG. 10 is a time flowchart illustrating a detailed method, performed by a server, of determining whether to provide interpretation situation information based on an accumulated delay time (ADT), according to an embodiment of the disclosure.

FIG. 10 is a time flowchart illustrating a detailed method, performed by the server 200, of determining whether to provide interpretation situation information based on an ADT, according to an embodiment of the disclosure.

FIG. 10 illustrates an example in which the server 200 sequentially receives speech inputs for a speaker's utterance from the device 100 and interprets them into English (En), according to an embodiment of the disclosure. In FIG. 10, each utterance may be a smallest semantic unit (e.g., a word, a phrase, or a sentence) capable of distinguishing the meaning. In FIG. 10, the server 200 sequentially receives a speech input for utterance 1 for 10 seconds, a speech input for utterance 2 for 8 seconds, a speech input for utterance 3 for 4 seconds, a speech input for utterance 4 for 4 seconds, and a speech input for utterance 5 for 10 seconds. In FIG. 10, the server 200 performs interpretation for each utterance.

Furthermore, in FIG. 10, a threshold value for determining whether an output of an interpretation result is delayed varies depending on the number of speech inputs accumulated without completion of interpretations thereof. For example, as the number of accumulated speech inputs increases, the threshold value may increase. Referring to FIG. 10, when the number of speech inputs for which interpretation is not completed is 1, a threshold value threshold1 may be set to 14 seconds, when the number of speech inputs for which interpretation is not completed is 2, a threshold value threshold2 may be set to 15 seconds, and when the number of speech inputs for which interpretation is not completed is 3, a threshold value threshold3 may be set to 16 seconds.

When reception of utterance 1 is completed at time point $t_1$, the server 200 may estimate an interpretation time for utterance 1 to be 13 seconds. The server 200 may calculate $ADT(t_1)$=13 seconds by adding the estimated interpretation time for utterance 1 (13 seconds) to the existing ADT $ADT(t_0)$ (zero seconds). Because the ADT $ADT(t_1)$ is less than the threshold value threshold1, the server 200 may determine not to transmit interpretation situation information.

When reception of utterance 2 is completed at time point $t_2$, the server 200 may estimate an interpretation time for utterance 2 to be 7 seconds. The server 200 may calculate $ADT(t_2)$=12 seconds by adding an estimated interpretation time for utterance 2 (7 seconds) to the existing ADT $ADT(t_1)$ (13 seconds) and then subtracting a time elapsed between time points $t_1$ and $t_2$ ($t_2-t_1$=8 seconds) from the resulting sum.

Because the interpretation of utterance 1 is not completed at time point $t_2$ and utterance 2 is additionally received, the server 200 may determine that the number of accumulated speech inputs for which interpretations are not completed is 2 and use the threshold value threshold2 (15 seconds). Because the updated ADT $ADT(t_2)$ (12 seconds) is less than the threshold value threshold2 (15 seconds), the server 200 may determine not to transmit interpretation situation information.

In the example shown in FIG. 10, the actual interpretation may be completed earlier than expected based on the estimated interpretation time (13 seconds) for utterance 1. When an actual time required is shorter than an estimated interpretation time, the server 200 may decrease an ADT by a difference therebetween. When the interpretation of utterance 1 is finished at time point $t_3$, the server 200 may measure an actual interpretation time to be 10 seconds, the actual interpretation time being from time point $t_1$ when utterance 1 by the speaker is finished to time point $t_3$ when audible reproduction of a corresponding interpretation result is finished. The server 200 may calculate ADT($t_3$)=7 seconds by subtracting, from the existing ADT ADT($t_2$) (12 seconds), a difference between the estimated interpretation time and the actual interpretation time for utterance 1 (13 seconds–10 seconds=3 seconds) and then subtracting a time elapsed between time points $t_2$ and $t_3$ ($t_3$–$t_2$=2 seconds) from the resulting difference.

Because the interpretation of utterance 1 is completed at time point $t_3$, the server 200 may determine that the only accumulated speech input for which interpretation is not completed is utterance 2, and may therefore use the threshold value threshold1 (14 seconds). Because the updated ADT ADT($t_3$) is less than the threshold value threshold1, the server 200 may determine not to transmit interpretation situation information.

When reception of utterance 3 is completed at time point $t_4$, the server 200 may estimate an interpretation time for utterance 3 to be 7 seconds. The server 200 may calculate ADT($t_4$)=12 seconds by adding an estimated interpretation time for utterance 3 (7 seconds) to the existing ADT ADT($t_3$) (7 seconds) and then subtracting a time elapsed between time points $t_4$ and $t_3$ ($t_4$–$t_3$=2 seconds) from the resulting sum.

Because the interpretation of utterance 2 is not completed at time point $t_4$ and utterance 3 is additionally received, the server 200 may determine that the number of accumulated speech inputs for which interpretations are not completed is 2 and use the threshold value threshold2 (15 seconds). Because the updated ADT ADT($t_4$) (12 seconds) is less than the threshold value threshold2 (15 seconds), the server 200 may determine not to transmit interpretation situation information.

When reception of utterance 4 is completed at time point $t_5$, the server 200 may estimate an interpretation time for utterance 4 to be 10 seconds. The server 200 may calculate ADT($t_5$)=18 seconds by adding an estimated interpretation time for utterance 4 (10 seconds) to the existing ADT ADT($t_4$) (12 seconds) and then subtracting a time elapsed between time points $t_5$ and $t_4$ ($t_5$–$t_4$=4 seconds) from the resulting sum.

Because the interpretation of utterance 2 is not completed at time point $t_5$ and utterance 4 is additionally received, the server 200 may determine that the number of accumulated speech inputs for which interpretations are not completed is 3 and use the threshold value threshold3 (16 seconds).

Because the updated ADT ADT($t_5$) (18 seconds) is greater than the threshold value threshold3 (16 seconds), the server 200 may determine to transmit interpretation situation information. For example, after reception of utterance 5 is finished, the server 200 may transmit, to the speaker, interpretation situation information indicating that an output of an interpretation result is delayed. The server 200 may guide the speaker to slow the speed of an utterance or stop the utterance for a short period of time by transmitting the interpretation situation information to the speaker. While the speaker decreases the speed of an utterance or stops the utterance for a short period of time, the server 200 may perform interpretations of utterances 2 through 5 that have been delayed, thereby reducing the number of utterances that have are not complete.

Figure 11:
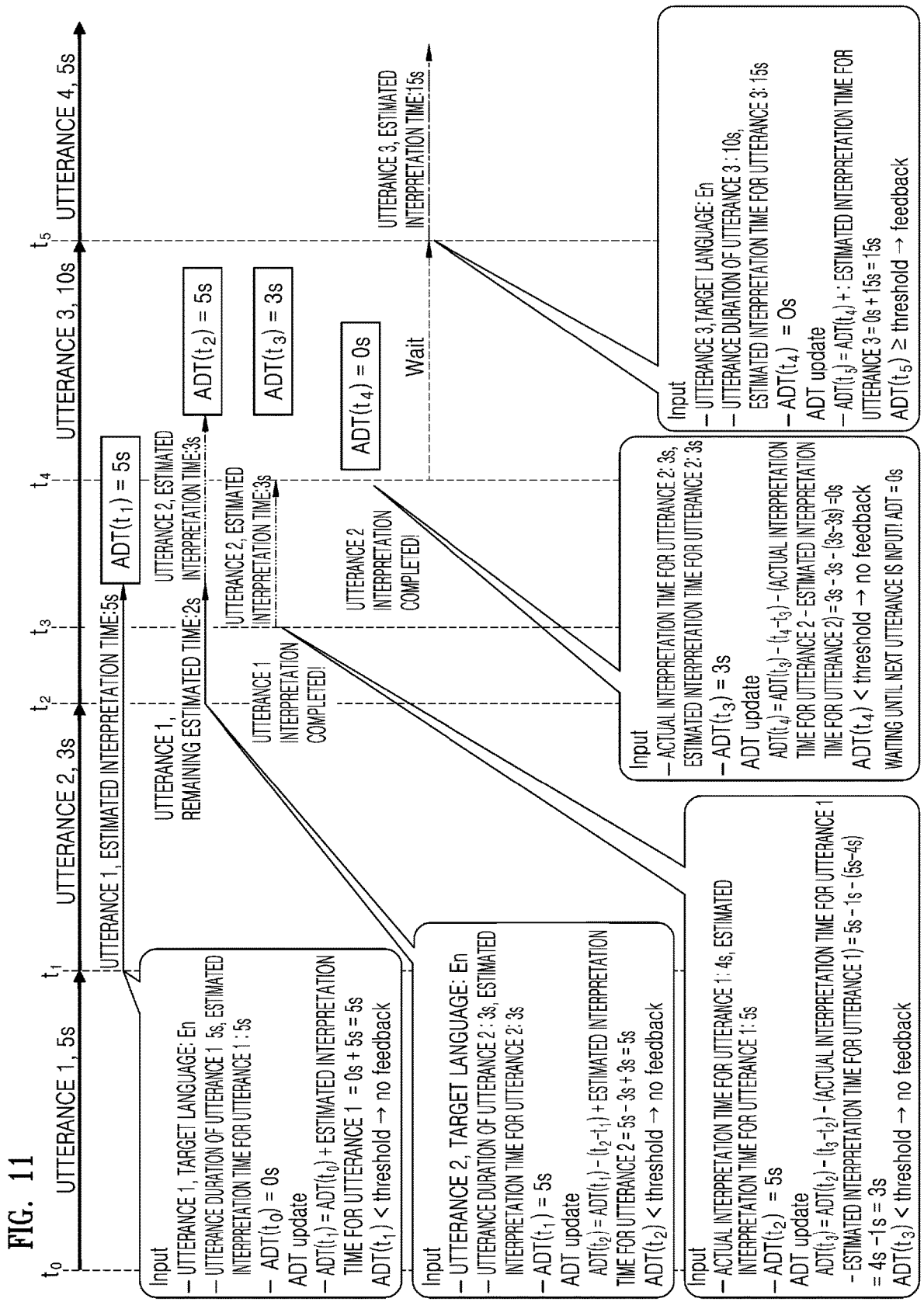
FIG. 11 is a time flowchart illustrating a detailed method, performed by a server, of determining whether to provide interpretation situation information based on an ADT according to an embodiment of the disclosure.

FIG. 11 is a time flowchart illustrating a detailed method, performed by the server 200, of determining whether to provide interpretation situation information based on an ADT, according to an embodiment of the disclosure.

FIG. 11 illustrates an example in which the server 200 sequentially receives speech inputs for a speaker's utterance from the device 100 and interprets them into English (En), according to an embodiment of the disclosure. In FIG. 11, each utterance may be a smallest semantic unit (e.g., a word, a phrase, or a sentence) capable of distinguishing the meaning. In FIG. 11, the server 200 sequentially receives a speech input for utterance 1 for 5 seconds, a speech input for utterance 2 for 3 seconds, a speech input for utterance 3 for 10 seconds, and a speech input for utterance 4 for 5 seconds. There may be a gap between the utterance 2 and the utterance 3. In FIG. 11, the server 200 performs interpretation for each utterance.

Furthermore, in FIG. 11, a threshold value for determining whether an output of an interpretation result is delayed is fixed to 10 seconds.

When reception of utterance 1 is completed at time point $t_1$, the server 200 may estimate an interpretation time for utterance 1 to be 5 seconds. The server 200 may calculate ADT($t_1$)=5 seconds by adding the estimated interpretation time for utterance 1 (5 seconds) to the existing ADT ADT($t_0$) (zero seconds). Because the updated ADT ADT($t_1$) (5 seconds) is less than the threshold value threshold (10 seconds), the server 200 may determine not to transmit interpretation situation information.

When reception of utterance 2 is completed at time point $t_2$, the server 200 may estimate an interpretation time for utterance 2 to be 3 seconds. The server 200 may calculate ADT($t_2$)=5 seconds by adding an estimated interpretation time for utterance 2 (3 seconds) to the existing ADT ADT($t_1$) (5 seconds) and then subtracting a time elapsed between time points $t_1$ and $t_2$ ($t_2$–$t_1$=3 seconds) from the resulting sum. Because the updated ADT ADT($t_2$) is less than the threshold value threshold (10 seconds), the server 200 may determine not to transmit interpretation situation information.

When the interpretation of utterance 1 is finished at time point $t_3$, the server 200 may measure an actual interpretation time to be 4 seconds, the actual interpretation time being from time point $t_1$ when utterance 1 by the speaker is finished to time point $t_3$ when audible reproduction of a corresponding interpretation result is finished. The server 200 may calculate ADT($t_3$)=3 seconds by subtracting, from the existing ADT ADT($t_2$) (5 seconds), a difference between the estimated interpretation time and the actual interpretation time for utterance 1 (5 seconds–4 seconds=1 second) and then subtracting a time elapsed between time points $t_2$ and $t_3$ ($t_3$–$t_2$=1 second) from the resulting difference. Because the updated ADT ADT($t_3$) (3 seconds) is less than the threshold value threshold (10 seconds), the server 200 may determine not to transmit interpretation situation information.

When the interpretation of utterance 2 is finished at time point $t_4$, the server 200 may measure an actual interpretation time to be 3 seconds, the actual interpretation time being from time point $t_2$ when utterance 1 by the speaker is finished to time point $t_4$ when audible reproduction of a corresponding interpretation result is finished. Because the estimated interpretation time for utterance 2 is equal to the actual interpretation time, the server 200 may not update the ADT based on the actual interpretation time for utterance 2. The server 200 may calculate ADT($t_4$)=0 seconds by subtracting only a time elapsed between time points $t_4$ and $t_3$ ($t_4$–$t_3$=3 seconds) from the existing ADT ADT($t_3$) (3 seconds), Because the updated ADT ADT($t_4$) (zero seconds) is less than the threshold value threshold (10 seconds), the server 200 may determine not to transmit interpretation situation information.

When the server 200 waits until reception of utterance 3 is completed and then the reception of utterance 3 is completed at time point $t_5$, the server 200 may estimate an interpretation time for utterance 3 to be 15 seconds. The server 200 may calculate ADT($t_5$)=15 seconds by adding an estimated interpretation time for utterance 3 (15 seconds) to the existing ADT ADT($t_4$) (zero seconds). Because the updated ADT ADT($t_5$) (15 seconds) is greater than the threshold value threshold (10 seconds), the server 200 may determine to transmit interpretation situation information.

For example, after reception of utterance 4 is finished or during the reception of utterance 4, the server 200 may transmit, to the speaker, interpretation situation information indicating that an output of an interpretation result is delayed. The server 200 may guide the speaker to decrease the speed of an utterance or stop the utterance for a short period of time by transmitting the interpretation situation information to the speaker. While the speaker decreases the speed of an utterance or stops the utterance for a short period of time, the server 200 may perform interpretation of utterance 3 that has been delayed.

As described above with reference to FIGS. 4 through 11, an interpretation system according to an embodiment of the disclosure may provide interpretation situation information via a server.

Hereinafter, a method, performed by an interpretation system, of providing interpretation situation information, according to various embodiments of the disclosure, will be described with reference to FIGS. 12A and 12B. In a situation where simultaneous interpretation is required because people are speaking various languages, devices provided to conversation participants may be classified into a speaker device and a listener device.

A speaker device may refer to a device that receives a user's utterance and transmits the utterance to a server or another device. A listener device may refer to a device that outputs an interpretation result for the speaker's utterance to the user. The listener device may receive the speaker's utterance from another device and directly interpret the utterance, or may receive an interpretation result from a server or another device.

In the following description, a speaker device or a listener device is described separately for convenience of description, and the role of each device is not fixed to that of the listener device or the speaker device. In other words, the device may be a speaker device or a listener device according to a user's role in a conversation.

For example, when a user of a first device speaks and a user of a second device listens, the first device may be a speaker device, and the second device may be a listener device. On the other hand, when the user of the second device speaks and the user of the first device listens, the first device may be a listener device, and the second device may be a speaker device.

Figure 12A:
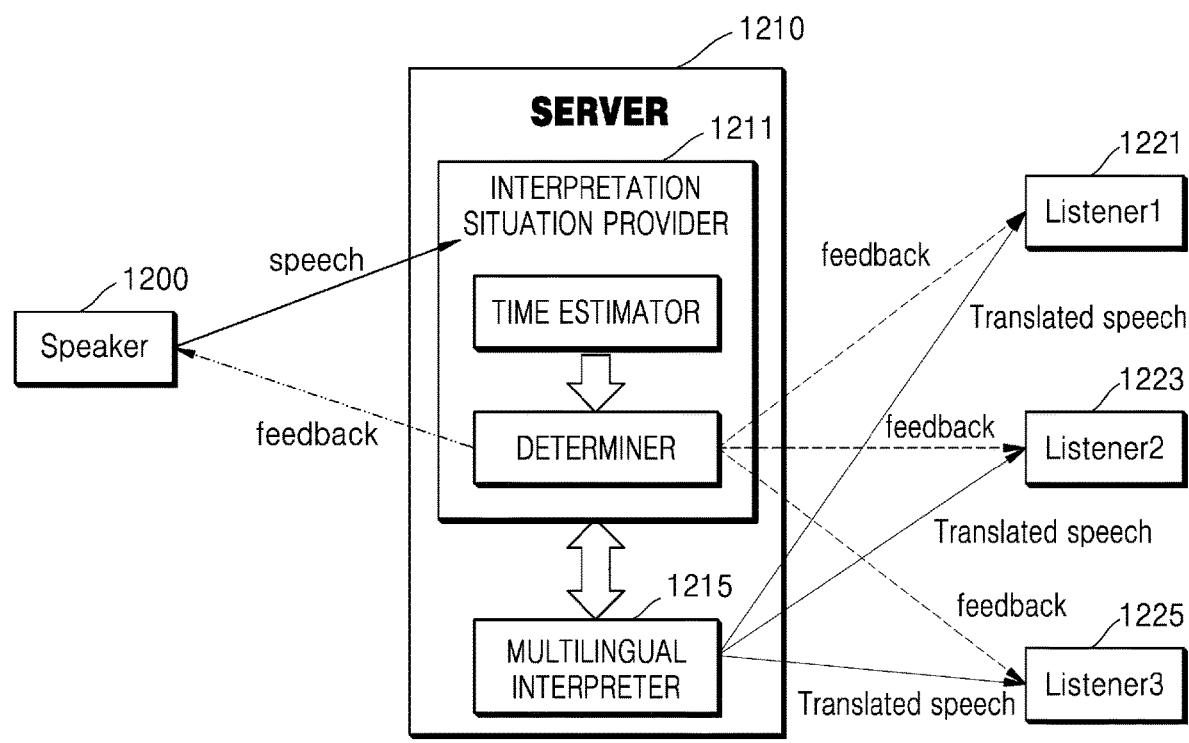
FIG. 12A is a schematic diagram of an interpretation system for providing interpretation situation information via a server, according to an embodiment.

FIG. 12A is a schematic diagram of an interpretation system for providing interpretation situation information via a server 1210, according to an embodiment of the disclosure.

According to an embodiment of the disclosure, a speaker device 1200 may transmit a speaker's speech to the server 1210. A time estimator of an interpretation situation provider 1211 of the server 1210 may obtain estimated interpretation times taken to interpret the speaker's speech into a plurality of target languages respectively corresponding to listener devices 1221, 1223, and 1225. A determiner of the interpretation situation provider 1211 of the server 1210 may transmit, based on an estimated interpretation time, feedback related to an interpretation situation to at least one device from among the speaker device 1200 and the listener devices 1221, 1223, and 1225.

In addition, a multilingual interpreter 1215 of the server 1210 may interpret the speaker's speech into the target languages and transmit corresponding interpretation results to the listener devices 1221, 1223, and 1225.

However, the disclosure is not limited to the illustration in FIG. 12A, and devices according to various embodiments of the disclosure may provide an interpretation service via an on-device interpretation system without interworking with a server.

Figure 12B:
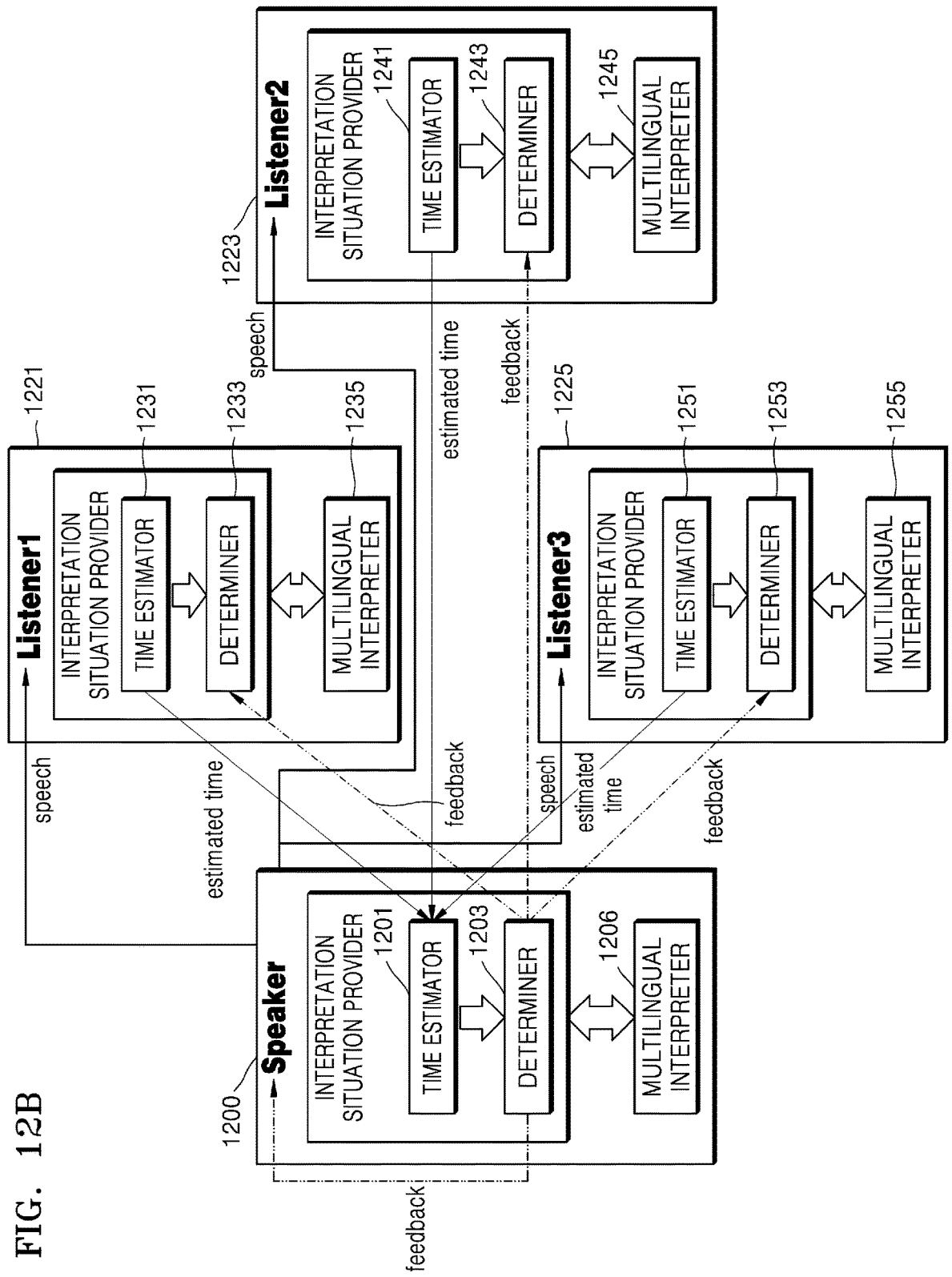
FIG. 12B is a schematic diagram of an interpretation system for providing interpretation situation information via an on-device interpretation system, according to an embodiment of the disclosure.

FIG. 12B is a schematic diagram of an interpretation system for providing interpretation situation information via an on-device interpretation system, according to an embodiment of the disclosure.

Referring to FIG. 12B, according to an embodiment of the disclosure, a speaker device 1200 may receive a speaker's speech and transmit the speech to a plurality of listener devices 1221, 1223, and 1225.

According to an embodiment of the disclosure, in an interpretation situation where a plurality of devices are participating, a control authority may be assigned to the speaker device 1200. For example, the listener devices 1221, 1223, and 1225 may be managed by the speaker device 1200. However, when one of a plurality of participants who were playing a role of a listener starts speaking, the role of the corresponding participant may be switched to that of a current speaker. Thus, as a device of the participant is changed to the speaker device, a control authority may be assigned to the device. Depending on an implementation method, one device or a plurality of devices may be determined as the speaker device.

According to an embodiment of the disclosure, when a plurality of participants speak simultaneously, devices of the participants who are speaking may be determined as speaker devices. When a plurality of participants speak simultaneously, devices corresponding to the participants may be sequentially determined as speaker devices. For example, when two or more participants speak simultaneously, a device acting as a speaker device may be changed in the order in which each utterance is transmitted to other devices.

According to an embodiment of the disclosure, the listener devices 1221, 1223, and 1225 may receive the speaker's speech and estimate times required to interpret the speech into target languages respectively corresponding to the listener devices 1221, 1223, and 1225. Estimated interpretation times respectively obtained by the time estimators 1231, 1241, and 1251 of the listener devices 1221, 1223, and 1225 may be transmitted to the speaker device 1200.

An interpretation situation provider of the speaker device 1200 that has received the estimated interpretation times respectively from the listener devices 1221, 1223, and 1225 may determine whether to provide interpretation situation related information. According to an embodiment of the disclosure, a time estimator 1201 of the speaker device 1200 may estimate a time that is expected to be required until interpretation by each of the listener devices 1221, 1223, and 1225 is finished.

A determiner 1203 of the speaker device 1200 may determine, based on the estimated time, whether to provide interpretation situation related information. The determiner 1203 may transmit feedback related to an interpretation situation to at least one device from among the speaker device 1200 and the listener devices 1221, 1223, and 1225.

For example, the determiner 1203 of the speaker device 1200 may provide feedback informing a delay of interpretation to the speaker at a time point when a speech input is received, at a time point when a speaker stops the speech for a short period of time, or at the end of the speech.

A determiner 1233, 1243, or 1253 of the listener device 1221, 1223, or 1225 may determine whether to provide feedback to a corresponding listener, based on the feedback received from the speaker device 1200. For example, the determiner 1233, 1243, or 1253 may provide the corresponding listener with feedback informing the delay of interpretation into another language at a time point when an output of an interpretation result is finished.

In addition, multilingual interpreters 1235, 1245, and 1255 of the listener devices 1221, 1223, and 1225 may interpret the speaker's speech into a plurality of target languages and transmit interpretation results to the listeners. The speaker device 1200 may include multilingual interpreter 1206, which may interpret speech into a plurality of target languages and transmit interpretation results to a listener when the speaker device 1200 is operating as a listener device.

Hereinafter, operations of a device included in the on-device interpretation system briefly described above with reference to FIG. 12B will be described in detail with reference to FIG. 13.

Figure 13:
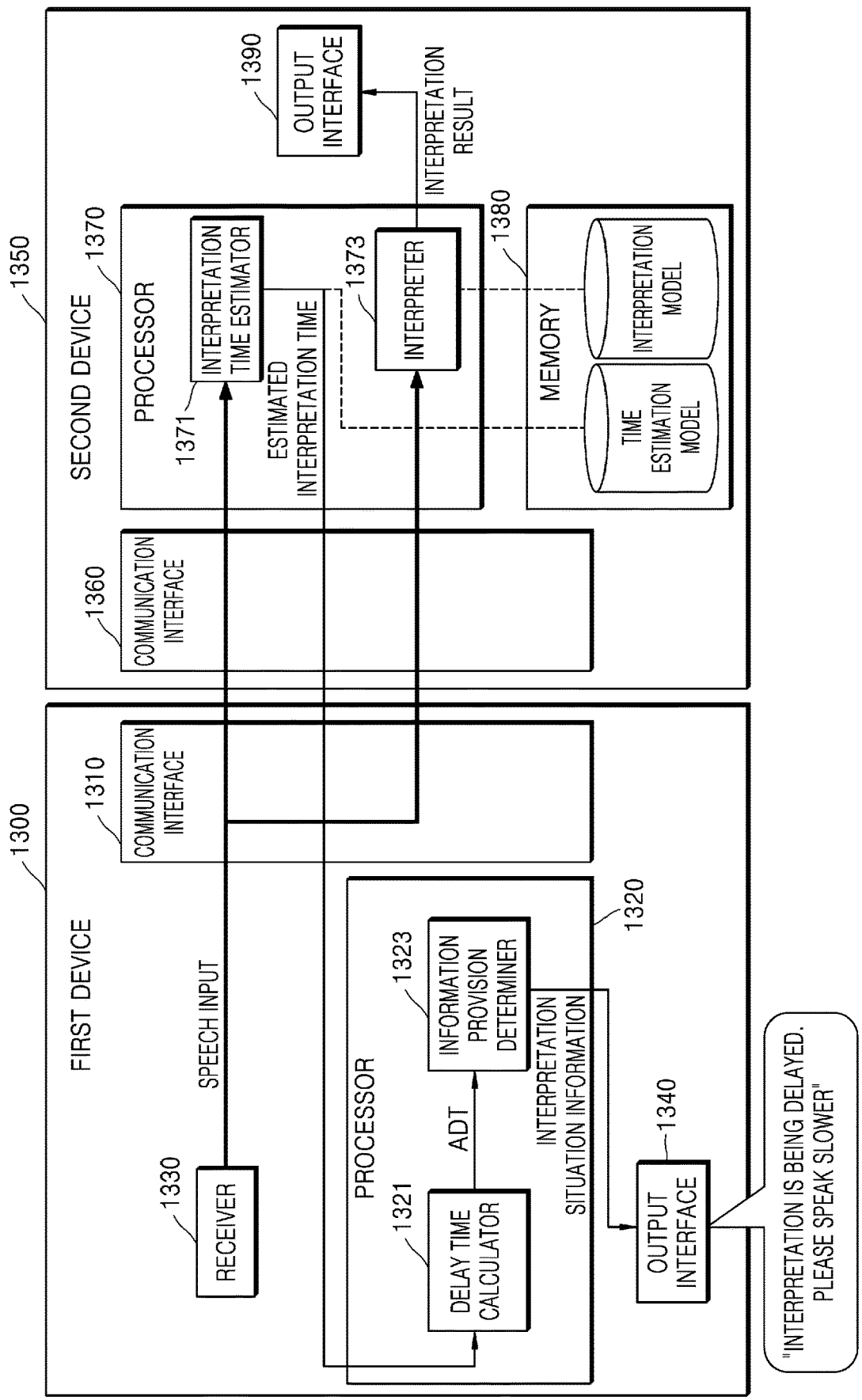
FIG. 13 is a detailed block diagram of an on-device interpretation system according to an embodiment of the disclosure.

FIG. 13 is a detailed block diagram of an on-device interpretation system according to an embodiment of the disclosure.

First and second devices 1300 and 1350 in FIG. 13 may respectively correspond to the speaker device 1200 and the listener device 1221 of FIG. 12B.

According to an embodiment of the disclosure, the first device 1300 may receive a speech uttered by a speaker in a first language via a microphone. For example, the microphone may be provided in, or connected via, receiver 1330 of the first device 1300. For example, the first device 1300 may receive and process a speech in units of a frame, or detect the presence or absence of a human speech by using VAD or EPD, and receive and process the speech in units of a sentence. Alternatively, the first device 1300 may detect an intent of the speech and receive and process the speech in units of a word, a phrase, or a sentence.

The first device 1300 may transmit, via a communication interface 1310, a speech input to the server 200 based on the speaker's speech. The "speech input" may include an audio signal of the speaker's speech itself or a result of processing the speech. For example, the result of processing the speech may include a feature vector extracted from the user's speech, a text into which the user's speech is converted, or a result output by performing NLU processing on the text. The first device 1300 may transmit a speech input to the second device 1350 in units of frames, words, phrases, sentences, or preset time intervals.

The second device 1350 may receive the speech input via the communication interface 1360. An interpretation time estimator 1371 of the processor 1370 may estimate a time required to interpret the speech input in the first language into a second language by using a time estimation model stored in a memory 1380.

A time required taken for interpretation may refer to a time from a time point when the speaker's speech for the speech input is finished to a time point when audible reproduction of a result of interpreting the speech input is finished. However, the disclosure is not limited thereto, and the time required for the speaker to make a speech input may also be included in the time required for interpretation. In other words, the time required for interpretation may refer to a time from a time point when the speech for the speech input is started to a time point when an output of the result of interpreting the speech input is finished.

According to an embodiment of the disclosure, the interpretation time estimator 1371 may estimate a required interpretation time by using a pre-trained time estimation model. Although FIG. 13 shows that the time estimation model is separate from an interpretation model, according to an embodiment of the disclosure, the interpretation time estimator 1371 may obtain, without using a separate time estimation model, an estimated interpretation time from the interpretation model as an intermediate output result before obtaining an interpretation result.

For example, the time estimation model may perform learning for estimating an interpretation time by using data (e.g., a parallel corpus) used for interpretation or translation training. For training of the time estimation model, speech inputs, target languages, and an actual time required for interpretation may be used. The time estimation model may estimate a required interpretation time even for an unlearned speech input by learning a vast amount of corpus data.

The second device 1350 may transmit the estimated interpretation time to the first device 1300. A delay time calculator 1321 of a processor 1320 of the first device 1300 may calculate an ADT based on the estimated interpretation time. The ADT is a delay time that increases as continuously received speech inputs are incompletely processed and then accumulated, and may indicate a time that is expected to be required until interpretations of the incompletely processed speech inputs are finished. The ADT may be a variable commonly applied to all utterances as a global variable. The ADT may decrease over time. In other words, as interpretations of unprocessed speech inputs proceed, the ADT may decrease.

According to an embodiment of the disclosure, the delay time calculator 1321 may update a previously calculated ADT based on an estimated interpretation time. For example, the delay time calculator 1321 may increase the ADT by an estimated interpretation time for a newly received speech input.

While FIG. 13 shows an example in which the first device 1300 is connected to one target device, the disclosure is not limited thereto, and as shown in FIG. 12B, the first device 1300 may be connected to a plurality of target devices. For example, the ADT may be a single variable commonly applied to a plurality of target languages or a variable applied individually to each target language.

According to an embodiment of the disclosure, an information provision determiner 1323 of the first device 1300 may determine whether to output interpretation situation information based on the ADT updated by the delay time calculator 1321.

When the ADT is greater than or equal to a threshold value, the information provision determiner 1323 may determine that an output of an interpretation result for the speaker's speech is excessively delayed. The information provision determiner 1323 may transmit interpretation situation information indicating that the output of the interpretation result is delayed to the speaker via an output interface 1340.

The threshold value taken into account by the information provision determiner 1323 to determine whether to transmit the interpretation situation information may be a fixed value, or may be a value that varies based on environment information, user information, speech information, etc.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an ADT, information about a language for which the interpretation is delayed, or a message notifying that the interpretation is delayed.

For example, the first device 1300 may transmit, via the output interface 1340, feedback "The interpretation is being delayed. Please speak a little slower," to the speaker as the interpretation situation information. As shown in FIG. 13, the interpretation system according to an embodiment of the disclosure may guide the speaker to decrease a speed of speech or stop the speech for a short period of time by transmitting the interpretation situation information to the speaker. When the speaker decreases the speed of speech or stops the speech for a short period of time, the second device 1350 may secure a time for finishing interpretations that have been delayed.

An interpreter 1373 of the processor 1370 of the second device 1350 may interpret the speech input in the first language into the second language. According to an embodiment of the disclosure, the interpreter 1373 may perform interpretation in units of sentences or EoS. However, the disclosure is not limited to this embodiment of the disclosure, and the interpreter 1373 may perform interpretation in smallest semantic units (e.g., words, phrases, or sentences) capable of distinguishing the meaning and output a result of the interpretation.

For example, although the second device 1350 receives in real-time the speech input in units of frames, the second device 1350 may perform interpretation in smallest semantic units and output an interpretation result via an output interface 1390. The second device 1350 may accumulate and store continuously received speech inputs, and when the accumulated speech inputs constitute a smallest semantic unit, the second device 1350 may provide an interpretation result by interpreting the accumulated speech inputs.

According to an embodiment of the disclosure, the second device 1350 may perform interpretation by using a pre-learned interpretation model in order to perform interpretation. The interpretation model may be an AI model separate from the time estimation model or that is capable of obtaining an estimated interpretation time as an intermediate output result before obtaining an interpretation result.

The interpretation result output via the output interface 1390 may include a text obtained by translating the speech input in the first language into the second language, or a speech output in the second language.

Operations of the first device 1300 included in the on-device interpretation system described above with reference to FIG. 13 will now be described in detail.

Figure 14:
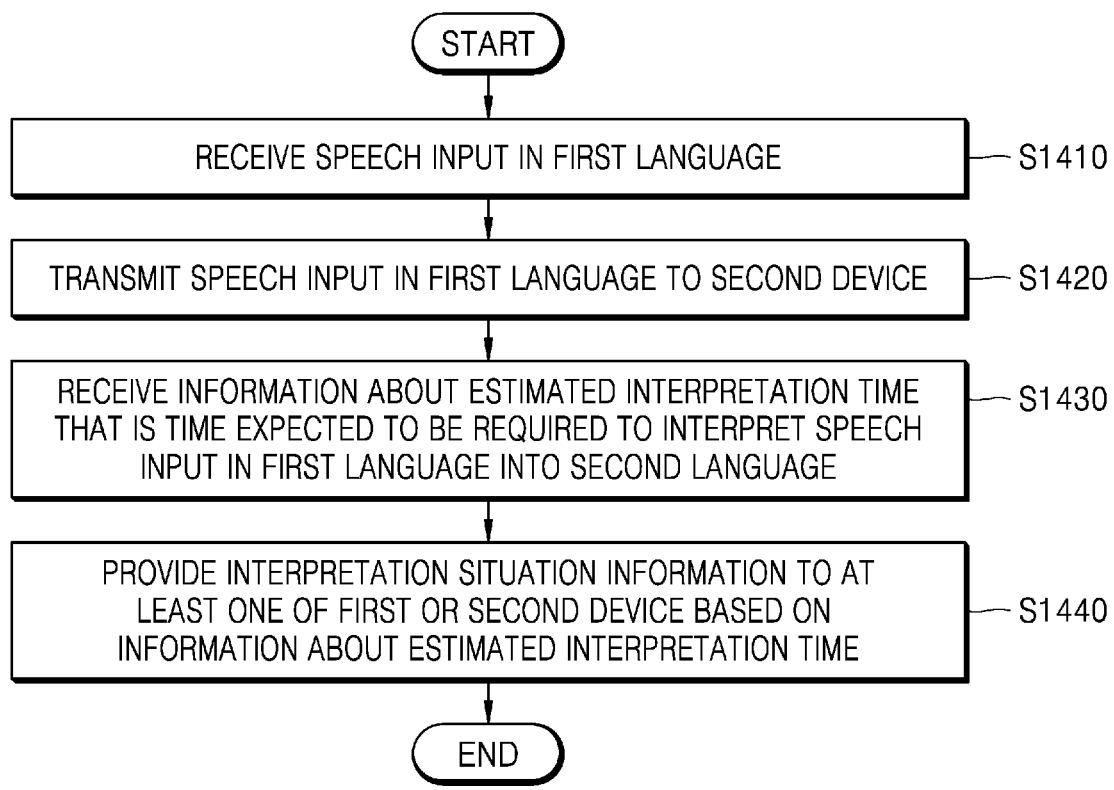
FIG. 14 is a flowchart of a method, performed by a device, of providing interpretation situation information, according to an embodiment of the disclosure.

FIG. 14 is a flowchart of a method, performed by a device, of providing interpretation situation information, according to an embodiment of the disclosure.

According to an embodiment of the disclosure, a first device may be connected to a plurality of devices in a wired or wireless manner. In the following description, the first device may correspond to the first device 1300 of FIG. 13, and a second device may correspond to the second device 1350 of FIG. 13. However, according to an embodiment of the disclosure, a role of the first device is not fixed to that of a speaker device. Thereafter, when a user of the second device speaks and a user of the first device listens, the first device may be a listener device, and the second device may be a speaker device.

In operation S1410, the first device may receive a speech input in a first language.

According to an embodiment of the disclosure, the first device may receive a speech input via a microphone. For example, the first device may receive a speech in units of a frame, or detect the presence or absence of a human speech by using VAD or EPD and receive the speech in units of sentences. Alternatively, the first device may detect an intent of the speech and receive the speech in units of words, phrases, or sentences.

In operation S1420, the first device may transmit the speech input in the first language to the second device.

The first device may transmit, to the second device, the speech input including an audio signal of the speaker's speech itself or a result of processing the speech. For example, a result of processing the speech may include a type of a language of a user's speech, a feature vector extracted from the user's speech, a text into which the user's speech is converted, or a result output by performing NLU processing on the text. The first device may transmit a speech input to the second device 1350 in units of frames, words, phrases, sentences, or preset time intervals.

In operation S1430, the first device may receive, from the second device, an estimated interpretation time that is a time expected to be required to interpret the speech input in the first language into a second language corresponding to the second device.

According to an embodiment of the disclosure, the estimated interpretation time received by the first device refer to the time expected to be required from a time point when the speaker's speech for the speech input is finished to a time point when audible reproduction of a result of interpreting the speech input is finished. Alternatively, the estimated interpretation time may be the time expected to be required from a time point when the speaker's speech for the speech input is started to a time point when audible reproduction of a result of interpreting the speech input is finished, or the time expected to be required from a time point when the speaker's speech for the speech input is finished to a time point when the audible reproduction of the result of interpreting the speech input is started.

The second device may obtain an estimated interpretation time by using an AI model. Descriptions related to a time estimation model used in a server-based interpretation system may be applied equally to an AI model used to obtain an estimated interpretation time. Thus, descriptions already provided above will not be repeated below.

In operation 1440, the first device may provide, based on the estimated interpretation time, interpretation situation information to at least one of the first device or the second device.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an ADT, information about a language for which the interpretation is delayed, or a message notifying that the interpretation is delayed.

According to an embodiment of the disclosure, the first device may update an ADT based on the estimated interpretation time and determine to transmit the interpretation situation information based on the updated ADT.

An ADT may be a delay time that is increased as speech inputs are incompletely processed and then accumulated. For example, the ADT may indicate a time that is expected to be required until interpretations of all unprocessed speech inputs are performed and audible reproduction of results of the interpretations is finished.

According to an embodiment of the disclosure, the first device may manage a plurality of ADT variables individually applied to a plurality of listener devices. Before providing the interpretation situation information, the first device may increase an ADT corresponding to a target language by an estimated interpretation time for the target language.

For example, the first device may increase an ADT by the estimated interpretation time received from the second device, and determine to transmit the interpretation situation information when the increased ADT is greater than or equal to a threshold value. The first device may output the interpretation situation information via an output interface thereof. For example, the first device may determine to transmit, to the speaker, interpretation situation information indicating that an output of an interpretation result is delayed, and transmit feedback "Please speak a little slower" to the speaker.

As another example, the first device connected to the second and third devices respectively corresponding to the second and third languages may transmit the speech input not only to the second device but also to the third device in operation S1420. When the interpretation into the second language is completed, the first device may measure an actual interpretation time required. For example, the first device may measure, as an actual interpretation time required, a time from a time point when the speaker's speech for the speech input is finished to a time point when audible reproduction of a result of interpreting the speech input into the second language is finished. Alternatively, the first device may receive an actual interpretation time required from the second device. The first device may decrease or increase an ADT corresponding to the second language by a difference between the estimated interpretation time and the actual interpretation time.

Furthermore, after interpretation into a second language among a plurality of target languages (e.g., the second language, a third language, etc.) is finished, the first device may determine whether an output of an interpretation result for the third language is delayed, based on an ADT corresponding to the third language. When interpretation into the third language is not finished, the first device may transmit interpretation situation information to the second device based on the ADT. When it is determined that the output of the interpretation result for the third language is excessively delayed, the first device may provide interpretation situation information indicating the excessive delay to the second device.

Moreover, an interpretation system according to an embodiment of the disclosure may adjust, based on an estimated interpretation time for a target language, an interpretation time for another target language.

Figure 15:
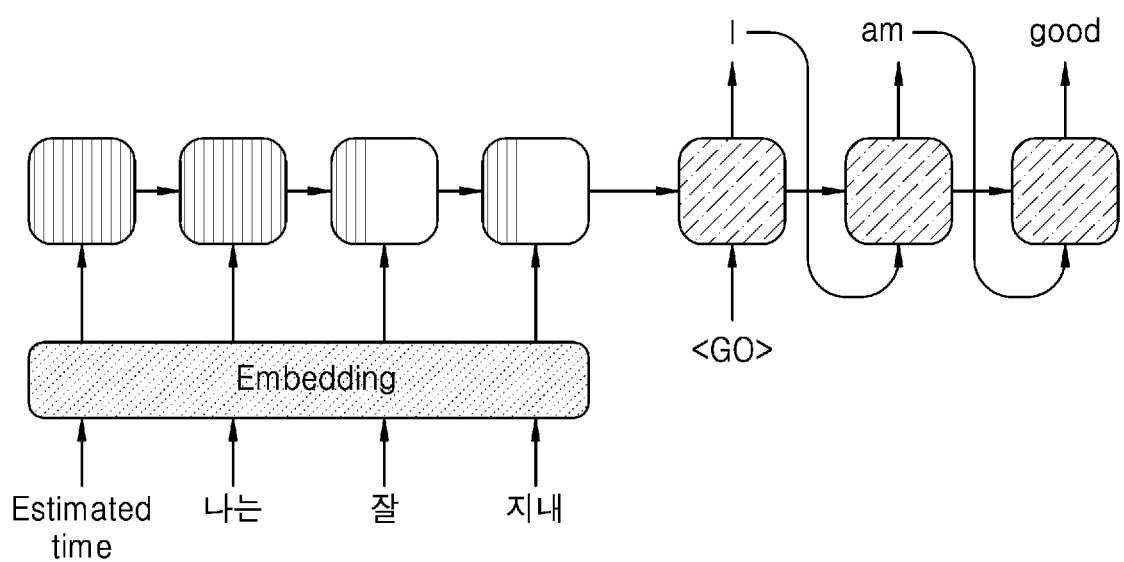
FIG. 15 is a diagram illustrating an operation of an interpretation model for performing interpretation in a second language based on an estimated interpretation time for a first language, according to an embodiment of the disclosure.

FIG. 15 is a diagram illustrating an operation of an interpretation model for performing interpretation in a second language based on an estimated interpretation time for a first language, according to an embodiment of the disclosure.

For example, according to an embodiment of the disclosure, the server 200 may adjust an interpretation time for another language based on an estimated interpretation time for a language having a longest estimated interpretation time.

As described above with reference to FIGS. 5A and 5B, according to an embodiment of the disclosure, the server 200 may obtain estimated interpretation times that are expected to be required to interpret a received speech input into a plurality of target languages. Thus, according to an embodiment of the disclosure, the server 200 may adjust interpretation times for the target languages so that they are similar to one another based on the estimated interpretation times.

For example, as shown in FIG. 15, the server 200 may apply, as an input of the interpretation model, an estimated interpretation time (e.g., a longest estimated interpretation time, a shortest estimated interpretation time, or the like) for another target language. The interpretation model may output, based on estimated interpretation times, an interpretation result so that interpretation is completed at a time point similar to a time point corresponding to an estimated interpretation time for another target language. For example, the interpretation model may select and output an interpretation result requiring a longest pronunciation time from among a plurality of interpretation results having the same meaning. Alternatively, the interpretation model may select and output an interpretation result requiring a shortest pronunciation time from among a plurality of interpretation results having the same meaning.

As another example, the server 200 may adjust a playback speed at which an interpretation result is output, based on an estimated interpretation time for another target language. For example, the server 200 may speed up or slow down playback of an interpretation result so that interpretation is completed at a time point similar to that corresponding to an estimated interpretation time for another target language.

As described above, when required interpretation times for a plurality of target languages are adjustable to be similar to one another based on the estimated interpretation times, audible reproduction of interpretation results are finished at similar time points. Accordingly, the server 200 may provide feedback informing a delay of interpretation only to the speaker.

A configuration of a server 200 according to an embodiment of the disclosure will now be described. Each component of the server 200 to be described below may perform a corresponding operation of the method, performed by the server 200, of providing interpretation situation information. Thus, descriptions that are already provided above are omitted.

Figure 16:
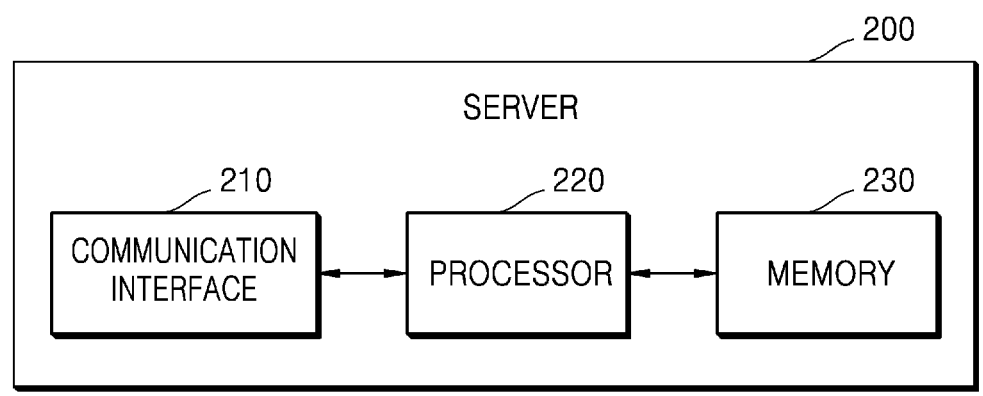
FIG. 16 is a block diagram of a server according to an embodiment of the disclosure.

FIG. 16 is a block diagram of the server 200.

According to an embodiment of the disclosure, the server 200 may be connected to a plurality of devices in a wired or wireless manner. The server 200 may share data, resources, and services with the devices, or may receive and process speech inputs from the devices and transmit speech outputs corresponding thereto. For example, the server 200 may be a mobile or stationary computing device, a device forming a network by connecting the devices 100-1, 100-2, 100-3, and 100-4 thereto, an edge device for processing data at an edge of the network, or a cloudlet representing a small-scale cloud datacenter.

Referring to FIG. 16, the server 200 may include a communication interface 210, a processor 220, and a memory 230. All components shown in FIG. 16 are not essential components of the server 200. The server 200 may be implemented with more or fewer components than those shown in FIG. 16.

Although FIG. 16 shows that the server 200 includes one processor 220, the disclosure is not limited to the illustrated embodiment. The server 200 may include a plurality of processors. When the server 200 includes a plurality of processors, operations and functions of the processor 220 to be described later may be partially performed by the plurality of processors.

According to an embodiment of the disclosure, the memory 230 of the server 200 may store instructions for providing interpretation situation information and an interpretation result, various models, neural networks, and dictionary information used for estimation of a required interpretation time and interpretation, etc.

According to an embodiment of the disclosure, by executing one or more instructions stored in the memory 230, the processor 220 provide interpretation services to a user.

Moreover, according to an embodiment of the disclosure, the communication interface 210 may communicate with an external device or a device by using a wireless or wired communication method. The communication interface 210 may include a short-range wireless communication module, a wired communication module, a mobile communication module, and a broadcast receiving module. The communication interface 210 may receive a speech input from a device and transmit an interpretation result for the received speech input to the device. Furthermore, the communication interface 210 may transmit interpretation situation information to a device.

First, according to an embodiment of the disclosure, the communication interface 210 of the server 200 may receive a speech input in a first language from a first device. The communication interface 210 may receive, from the first device, the speech input including an audio signal of a speaker's utterance itself or a result of processing the utterance.

According to an embodiment of the disclosure, the processor 220 of the server 200 may obtain, by using an AI model, an estimated interpretation time that is the time expected to be required to interpret the speech input in the first language into a second language corresponding to a second device. The AI model for obtaining an estimated interpretation time may be stored in the memory 230.

According to an embodiment of the disclosure, the processor 220 may obtain, as an estimated interpretation time, an expected time from a time point when the speaker's utterance for the speech input is finished to a time point when audible reproduction of a result of interpreting the speech input is finished. Alternatively, the processor 220 may obtain, as an estimated interpretation time, a time expected to be required from a time point when the speaker's utterance for the speech input is started to a time point when audible reproduction of a result of interpreting the speech input is finished, or a time expected to be required from a time point when the speaker's utterance for the speech input is finished to a time point when the audible reproduction of the result of interpreting the speech input is started.

For example, the AI model used to obtain the estimated interpretation time may be a model trained on a plurality of speech inputs in the first language and times taken when interpreting the speech inputs in the first language into the second language As another example, the AI model used to obtain the estimated interpretation time may be an interpretation model for interpreting a speech input in the first language into the second language and may output the estimated interpretation time before outputting a result of the interpretation into the second language.

According to an embodiment of the disclosure, the processor 220 may transmit interpretation situation information to at least one of the first device or the second device based on the estimated interpretation time.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an ADT, information about a language for which the interpretation is delayed, or a message notifying that the interpretation is delayed.

According to an embodiment of the disclosure, the processor 220 may update an ADT based on the estimated interpretation time and determine whether to transmit the interpretation situation information based on the updated ADT.

According to an embodiment of the disclosure, the processor 220 may increase an ADT by the estimated interpretation time and determine to transmit the interpretation situation information when the increased ADT is greater than or equal to a threshold value. The processor 220 may transmit the interpretation situation information to the first device. For example, the threshold value may be a fixed value, but may be a value that varies based on at least one of environment information, user information, or utterance information.

According to an embodiment of the disclosure, the processor 220 may interpret the speech input in the first language into the second language, and transmit a result of interpreting the speech input into the second language to the second device.

The processor 220 may transmit, via the communication interface 210, a text output obtained by translating the speech input in the first language into the second language, or a speech output to the second device.

According to an embodiment of the disclosure, the server 200 may be connected to a third device as well as the first and second devices. The server 200 may provide a multilingual interpretation service for interpreting the speech input in the first language into the second language corresponding to the second device and a third language corresponding to the third device.

According to an embodiment of the disclosure, the processor 220 may transmit interpretation situation information to at least one of the first device or the second device based on an actual interpretation time required.

For example, when the interpretation of the speech input into the second language is finished, the processor 220 may measure an actual interpretation time required from a time point when the speaker's utterance for the speech input is finished to a time point when the audible reproduction of a result of the interpretation is finished. The processor 220 may decrease or increase an ADT by a difference between the estimated interpretation time and the measured actual interpretation time. When interpretation of the speech input into the third language is not finished (for example, when an output of a result of the interpretation into the third language is not finished), the processor 220 may transmit interpretation situation information to the second device based on the ADT updated based on an actual interpretation time required.

A configuration of a device 100 according to an embodiment will now be described in detail. Each component of the device 100 to be described below may perform a corresponding operation of the operation method of the device 100. Thus, descriptions that are already provided above are omitted.

Figure 17:
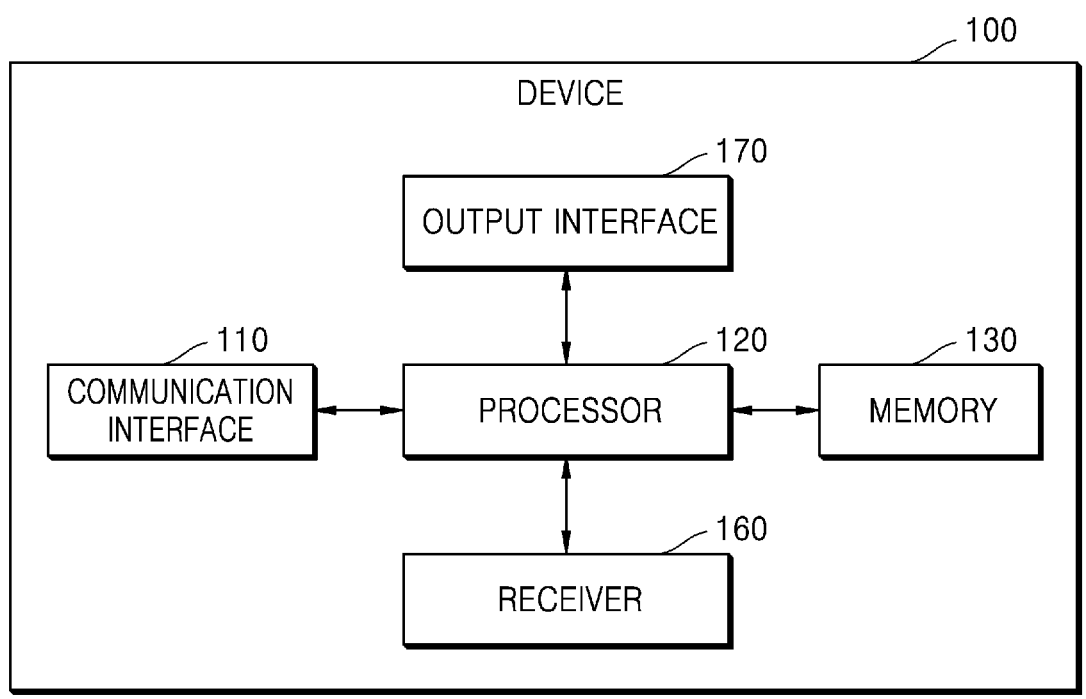
FIG. 17 is a block diagram of a device according to an embodiment of the disclosure.

FIG. 17 is a block diagram of the device 100 according to an embodiment of the disclosure.

According to an embodiment of the disclosure, the device 100 may be a mobile terminal or a stationary terminal implemented as a computer device. For example, the device 100 may be at least one of a smartphone, a mobile phone, a navigation device, a computer, a notebook computer, a digital broadcasting terminal, an AI speaker device, a speaker device, a PDA, a PMP, or a tablet PC, but is not limited thereto. The device 100 may communicate with another device and/or a server through a network by using a wireless or wired communication method.

Figure 18:
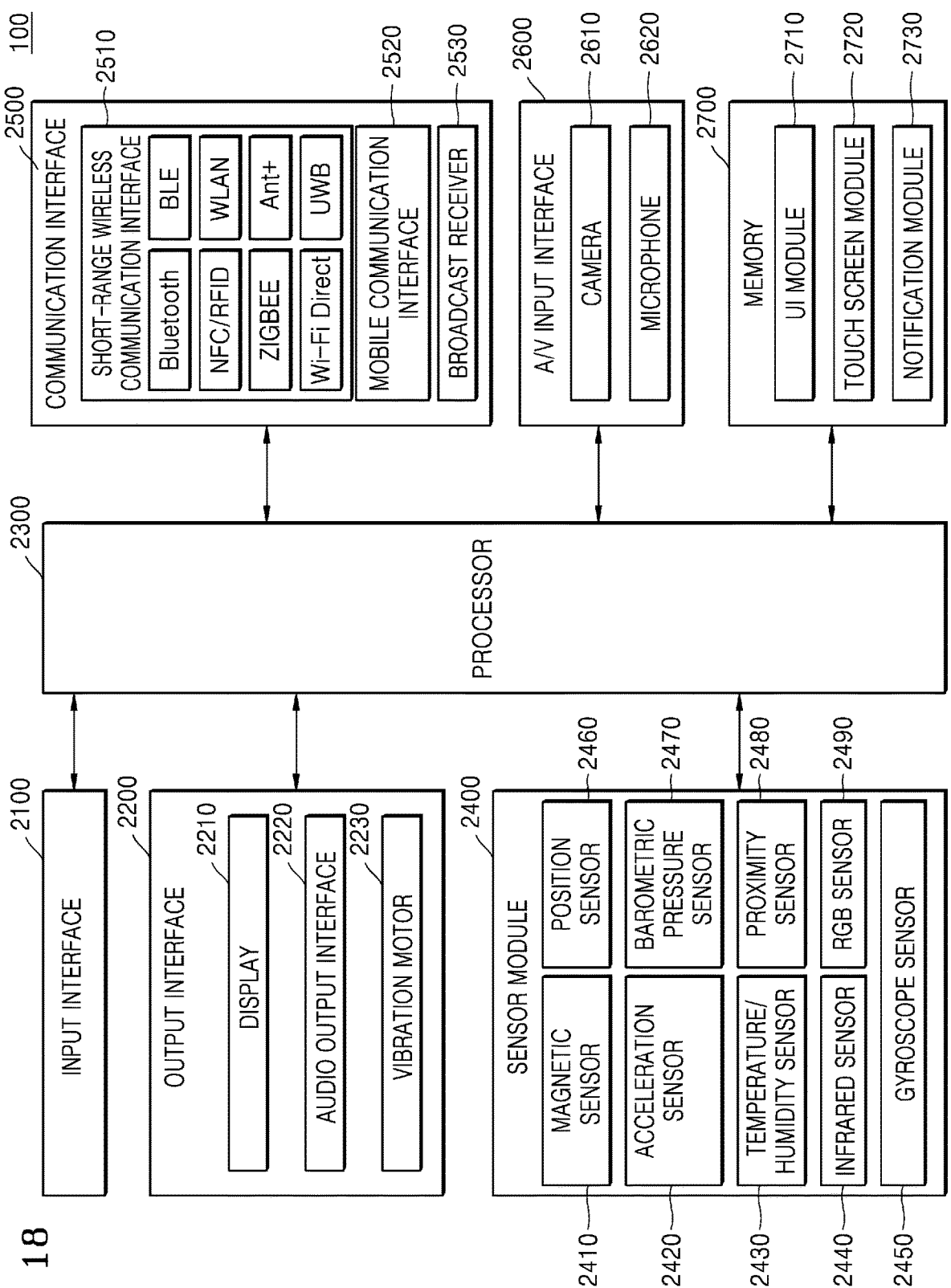
FIG. 18 is a detailed block diagram of a device according to an embodiment of the disclosure.

Referring to FIG. 17, the device 100 may include a communication interface 110, a processor 120, a memory 130, a receiver 160, and an output interface 170. All components shown in FIG. 17 are not essential components of the device 100. The device 100 may be implemented with more or fewer components than those shown in FIG. 17. For example, as shown in FIG. 18, according to some embodiments of the disclosure, the device 100 may further include an input interface 2100, a sensor module 2400, an audio/video (A/V) input interface 2600.

Although FIG. 17 shows that the device 100 includes one processor 120, the disclosure is not limited to the illustrated embodiment. The device 100 may include a plurality of processors. When the device 100 includes a plurality of processors, operations and functions of the processor 120 to be described later may be partially performed by the plurality of processors.

According to an embodiment of the disclosure, the communication interface 110 may communicate with an external device, a device, or a server by using a wireless or wired communication method. The communication interface 110 may include a short-range wireless communication module, wired communication module, a mobile communication module, and a broadcast receiving module.

According to an embodiment of the disclosure, by executing one or more instructions stored in the memory 130, the processor 120 may provide interpretation situation information. According to an embodiment of the disclosure, the memory 130 may store instructions for providing interpretation services, various models, neural networks, and dictionary information used for estimation of a required interpretation time and interpretation, etc.

According to an embodiment of the disclosure, the processor 120 may be connected to a plurality of devices in a wired or wireless manner and provide interpretation situation information. Operations of the processor 120 when the device 100 operates as a speaker device are described below. However, a role of the device 100 according to an embodiment of the disclosure is not fixed to that of a speaker device.

According to an embodiment of the disclosure, the receiver 160 may receive a speech signal from a user. For example, the receiver 160 may receive a speech signal by converting an external sound into electrical sound data using a microphone.

According to an embodiment of the disclosure, the receiver 160 may receive a speech input in a first language. The device 100 may receive a speech input via the receiver 160. For example, the device 100 may receive an utterance in units of frames, or detect the presence or absence of a human speech by using VAD or EPD and receive an utterance in units of sentences. The device 100 may detect an intent of an utterance and receive the utterance in units of words, phrases, or sentences.

The processor 120 may control the communication interface 110 to transmit the speech input in the first language to a second device.

The processor 120 may transmit, to the second device, the speech input including an audio signal of a speaker's utterance itself or a result of processing the utterance. For example, a result of processing a user's utterance may include a type of a language of the user's utterance, a feature vector extracted from the user's utterance, a text into which the user's utterance is converted, or a result output by performing NLU processing on the text. The device 100 may transmit a speech input in units of frames, words, phrases, sentences, or preset time intervals, to the second device.

The communication interface 110 may receive, from the second device, an estimated interpretation time expected to be required to interpret the speech input in the first language into a second language corresponding to the second device.

According to an embodiment of the disclosure, the estimated interpretation time received by the device 100 may represent the expected time from a time point when the speaker's utterance for the speech input is finished to a time point when audible reproduction of a result of interpreting the speech input is finished. Alternatively, the estimated interpretation time may be the expected time from a time point when the speaker's utterance for the speech input is started to a time point when audible reproduction of a result of interpreting the speech input is finished, or the expected time from a time point when the speaker's utterance for the speech input is finished to a time point when the audible reproduction of the result of interpreting the speech input is started.

The processor 120 may provide interpretation situation information to at least one of the first device or the second device based on the estimated interpretation time.

According to an embodiment of the disclosure, the interpretation situation information may include at least one of information about whether the interpretation is delayed, a command for instructing an output of a notification of an interpretation situation, information about a device from which the notification of the interpretation situation is to be output, information about an ADT, information about a language for which the interpretation is delayed, or a message notifying that the interpretation is delayed.

According to an embodiment of the disclosure, the processor 120 may update an ADT based on the estimated interpretation time and determine whether to transmit the interpretation situation information based on the updated ADT.

An ADT may be a delay time that is increased as speech inputs are incompletely processed and then accumulated. For example, an ADT may indicate a time expected to be required until interpretations of all unprocessed speech inputs are performed and audible reproduction of results of the interpretations are finished.

According to an embodiment of the disclosure, the processor 120 may manage a plurality of ADT variables individually applied to a plurality of listener devices. Before providing the interpretation situation information, the processor 120 may increase an ADT corresponding to a target language by an estimated interpretation time for the target language.

For example, the processor 120 may increase an ADT by the estimated interpretation time received from the second device, and determine to provide the interpretation situation information when the increased ADT is greater than or equal to a threshold value. The processor 120 may output the interpretation situation information via the output interface 170. For example, the processor 120 may determine to transmit, to the speaker, interpretation situation information indicating that an output of an interpretation result is delayed, and transmit feedback "Please speak a little slower" via the output interface 170.

As another example, the device 100 connected to the second device corresponding to the second language and a third device corresponding to a third language may transmit the speech input not only to the second device but also to the third device. For example, when the interpretation into the second language is finished, the processor 120 of the device 100 may measure an actual interpretation time required from a time point when the speaker's utterance for the speech input is finished to a time point when the audible reproduction of a result of the interpretation is finished. Alternatively, the processor 120 may receive the actual interpretation time from the second device. The processor 120 may decrease or increase an ADT corresponding to the second language by a difference between the estimated interpretation time and the actual interpretation time.

Furthermore, after the interpretation into the second language among a plurality of target languages (e.g., the second and third languages, etc.) is finished, the processor 120 may determine whether an output of an interpretation result for the third language is delayed, based on an ADT corresponding to the third language. When the interpretation into the third language is not finished, the processor 120 may transmit, via the communication interface 110, interpretation situation information to the second device based on the ADT. When it is determined that the output of the interpretation result for the third language is excessively delayed, the processor 120 may provide interpretation situation information indicating the excessive delay to the second device.

According to an embodiment of the disclosure, the output interface 170 of the device 100 may output information received from the outside, processed by the processor 120, or stored in the memory 130 in the form of at least one of light, sound, image, or vibration. For example, the output interface 170 may include at least one of a display or a speaker device for outputting interpretation situation information.

FIG. 18 is a detailed block diagram of a device 100 according to an embodiment of the disclosure.

The device 100 of FIG. 18 may include components corresponding to their counterparts of the device 100 described with reference to FIG. 17. For example, among the components shown in FIG. 18, a processor 2300, an output interface 2200, and a microphone 2620 may respectively correspond to the processor 120, the output interface 170, and the receiver 160 described with reference to FIG. 17. Furthermore, a memory 2700 may store, like the memory 130 of FIG. 17, instructions for providing interpretation services, various models, neural networks, and dictionary information used for estimation of an interpretation time and interpretation, etc. Thus, descriptions that are already provided above are omitted.

The device 100 of FIG. 18 may perform all the operations and functions of the device 100 described with reference to FIGS. 1 through 15. Thus, only components of the device 100, which have not been described above, will now be described.

Referring to FIG. 18, the device 100 may include the input interface 2100, the output interface 2200, the processor 2300, the sensor module 2400, a communication interface 2500, the A/V input interface 2600, and the memory 2700.

The input interface 2100 refers to a device via which a user inputs data for controlling an operation of the device 100. Examples of the input interface 2100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch. The input interface 2100 may receive a user input necessary to generate conversational information to be provided to the user.

The output interface 2200 may output an audio signal, a video signal, or a vibration signal, and include a display 2210, an audio output interface 2220, and a vibration motor 2230.

The vibration motor 2230 may output a vibration signal. For example, the vibration motor 2230 may output a vibration signal corresponding to an output of video data or audio data (e.g., a call signal reception sound, a message reception sound, etc.).

The sensor module 2400 may detect a status of the device 100 or the surroundings thereof and transmit information about the detected status to the processor 2300.

The sensor module 2400 may include, but is not limited to, at least one of a magnetic sensor 2410, an acceleration sensor 2420, a temperature/humidity sensor 2430, an infrared sensor 2440, a gyroscope sensor 2450, a position sensor (e.g., a global positioning system (GPS)) 2460, a barometric pressure sensor 2470, a proximity sensor 2480, or an RGB sensor (an illuminance sensor) 2490. Because functions of the above-described sensors may be inferred intuitively by those of ordinary skill in the art, detailed descriptions thereof will be omitted below.

The communication interface 2500 may include components for performing communication with another device. For example, the communication interface 2500 may include a short-range wireless communication interface 2510, a mobile communication interface 2520, and a broadcast receiver 2530.

The short-range wireless communication interface 2510 may include, but is not limited to, a Bluetooth communication module, a Near Field communication (NFC) module, a wireless local area network (WLAN) (or Wi-Fi) communication module, a Zigbee communication module, an Infrared Data Association (IrDA) communication module, a Wi-Fi direct (WFD) communication module, a ultra-wideband (UWB) communication module, and an Ant+ communication module.

The A/V input interface 2600 for inputting an audio or video signal may include a camera 2610, the microphone 2620, etc. The camera 2610 may obtain an image frame such as a still or moving image via an image sensor in a video call mode or capture mode. An image captured via the image sensor may be processed by the processor 2300 or a separate image processor.

An image frame processed by the camera 2610 may be stored in the memory 2700 or transmitted to the outside via the communication interface 2500. The camera 2610 may include two or more cameras depending on a configuration of the device 100.

The microphone 2620 receives an external sound signal and process the sound signal as electrical audio data. For example, the microphone 2620 may receive a sound signal from an external device or a speaker. The microphone 2620 may use various noise removal algorithms to remove noise generated in the process of receiving an external sound signal. The receiver 160 of FIG. 17 may correspond to the microphone 2620 of FIG. 18.

The memory 2700 may store programs necessary for processing or control operations performed by the processor 2300 or store data input to or output from the device 100.

The memory 2700 may include at least one type of storage medium, i.e., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

Programs stored in the memory 2700 may be categorized into a plurality of modules according to their functions, such as a user interface (UI) module 2710, a touch screen module 2720, a notification module 2730, etc.

The UI module 2710 may provide, for each application, a specialized UI, a graphical UI (GUI), etc. interworking with the device 100. The touch screen module 2720 may detect a user's touch gesture on a touch screen and transmit information about the detected touch gesture to the processor 2300. According to some embodiments of the disclosure, the touch screen module 2720 may recognize and analyze a touch code. The touch screen module 2720 may be formed by separate hardware components including a controller.

The notification module 2730 may generate a signal for notifying the occurrence of an event in the device 100. Examples of events occurring in the device 100 include call signal reception, message reception, key signal input, and schedule notification. The notification module 2730 may output a notification signal in the form of a video signal via the display 2210, a notification signal in the form of an audio signal via the audio output interface 2220, and a notification signal in the form of a vibration signal via the vibration motor 2230.

Furthermore, embodiments of the disclosure may be implemented as a software program including instructions stored in computer-readable storage media.

A computer refers to a device capable of retrieving an instruction stored in a computer-readable storage medium and performing operations according to the retrieved instruction, and may include an interpretation service providing apparatus and an interpretation service providing server according to embodiments of the disclosure.

The computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium.

Furthermore, devices or methods according to embodiments of the disclosure may be included in the form of a computer program product when provided. The computer program product may be traded, as a product, between a seller and a buyer.

The computer program product may include a software program and a computer-readable storage medium having stored thereon the software program. For example, the computer program product may include a product (e.g. a downloadable application) in the form of a software program electronically distributed by a manufacturer of an electronic device or through an electronic market (e.g., Google™ Play Store and App Store). For such electronic distribution, at least a part of the software program may be stored on the storage medium or may be temporarily generated. For example, the storage medium may be a storage medium of a server of the manufacturer, a server of the electronic market, or a relay server for temporarily storing the software program.

In a system consisting of a server and a terminal (e.g., an interpretation service providing device and an interpretation service providing server), the computer program product may include a storage medium of the server or a storage medium of the terminal. Alternatively, in a case where there is a third device (e.g., a smartphone) communicatively connected to the server or the terminal, the computer program product may include a storage medium of the third device. Alternatively, the computer program product may include a software program itself that is transmitted from the server to the terminal or the third device or that is transmitted from the third device to the terminal.

For example, one of the server, the terminal, and the third device may execute the computer program product to perform methods according to embodiments of the disclosure. Alternatively, at least two of the server, the terminal, and the third device may execute the computer program product to perform the methods according to embodiments of the disclosure in a distributed manner.

For example, the server (e.g., a cloud server, an AI server, or the like) may execute the computer program product stored therein to control the terminal communicatively connected to the server to perform the methods according to embodiments of the disclosure.

As another example, the third device may execute the computer program product to control the terminal communicatively connected to the third device to perform the methods according to embodiments of the disclosure. As a specific example, the third device may remotely control an interpretation service providing apparatus or an interpretation service providing server to transmit or receive interpretation situation information or an interpretation result.

In a case where the third device executes the computer program product, the third device may download the computer program product from the server, and may execute the downloaded computer program product. Alternatively, the third device may execute the computer program product that is pre-loaded therein, and may perform methods according to embodiments of the disclosure.

The invention claimed is:

1. A method performed by a server connected to a first device, a second device and a third device, the method comprising:
   receiving a speech input in a first language from the first device;
   obtaining, by using an artificial intelligence (AI) model, a first estimated interpretation time that indicates a first time expected to be required to interpret the speech input in the first language into a second language;
   transmitting, based on the first estimated interpretation time, interpretation situation information to at least one of the first device, the second device or the third device;
   interpreting the speech input in the first language into the second language and a third language;
   transmitting, to the second device a result of the interpreting of the speech input into the second language;
   transmitting, to the third device a result of the interpreting of the speech input into the third language; and
   when the interpreting of the speech input into the third language is not finished, transmitting the interpretation situation information to the second device based on an accumulated delay time.

2. The method of claim 1, wherein the transmitting of the interpretation situation information comprises:
updating the accumulated delay time based on the first estimated interpretation time; and
identifying whether to transmit the interpretation situation information based on the accumulated delay time.

3. The method of claim 2, further comprising:
measuring an actual interpretation time from a first time point when a speaker's utterance for the speech input is finished to a second time point when reproduction of the result of the interpreting of the speech input into the second language is finished; and
modifying the accumulated delay time based on a difference between the first estimated interpretation time and the actual interpretation time.

4. The method of claim 1, wherein the transmitting of the interpretation situation information comprises:
increasing the accumulated delay time by the first estimated interpretation time; and
transmitting the interpretation situation information to the first device based on the accumulated delay time being greater than or equal to a threshold value.

5. The method of claim 4, further comprising modifying the threshold value changes based on at least one of environment information, user information, or utterance information.

6. The method of claim 1, wherein the AI model comprises a model trained on a plurality of speech inputs in the first language and corresponding times taken to interpret the plurality of speech inputs in the first language into the second language.

7. The method of claim 1, wherein the AI model comprises an interpretation model configured to interpret the speech input in the first language into the second language,
wherein the interpreting comprises using the interpretation model to interpret the speech input in the first language into the second language, and
wherein the method further comprises:
providing the first estimated interpretation time to the second device; and
providing the result of the interpreting of the speech input into the second language to the second device.

8. The method of claim 1, wherein the first estimated interpretation time indicates an expected time from a first time point when a speaker's utterance for the speech input is finished to a second time point when reproduction of the result of the interpreting of the speech input into the second language is finished.

9. The method of claim 1, wherein the interpretation situation information comprises at least one of information about whether interpretation is delayed, a command for instructing an output of a notification of an interpretation situation, information about a device from which the notification of the interpretation situation is to be output, information about the accumulated delay time, information about a language for which the interpretation is delayed, or a message notifying that the interpretation is delayed.

10. The method of claim 1, wherein the method further comprises:
measuring an actual interpretation time required from a first time point when a speaker's utterance for the speech input is finished to a second time point when reproduction of the result of the interpreting of the speech input into the second language is finished; and
decreasing or increasing the accumulated delay time by a difference between the first estimated interpretation time and the actual interpretation time required.

11. A server comprising:
a communication interface configured to communicate with a plurality of devices, the plurality of devices comprising a first device, a second device and a third device;
a memory storing one or more instructions; and
a processor configured to execute the one or more instructions stored in the memory to:
receive, via the communication interface, a speech input in a first language from the first device;
obtain, by using an artificial intelligence (AI) model, a first estimated interpretation time that indicates a first time expected to be required to interpret the speech input in the first language into a second language;
transmit, via the communication interface, interpretation situation information to at least one of the first device, the second device or the third device based on the first estimated interpretation time;
interpret the speech input in the first language into the second language and a third language;
transmit, via the communication interface, a result of the interpreting of the speech input into the second language to the second device;
transmit, via the communication interface, a result of the interpreting of the speech input into the third language to the third device; and
when interpretation of the speech input into the third language is not finished, transmit, via the communication interface, the interpretation situation information to the second device based on an accumulated delay time.

12. The server of claim 11, wherein the processor is further configured to execute the one or more instructions to:
update the accumulated delay time based on the first estimated interpretation time; and
identify whether to transmit the interpretation situation information, based on the accumulated delay time.

13. The server of claim 11, wherein the processor is further configured to execute the one or more instructions to:
increase the accumulated delay time by the first estimated interpretation time; and
transmit, via the communication interface, the interpretation situation information to the first device based on the accumulated delay time being greater than or equal to a threshold value.

14. The server of claim 11, wherein the processor is further configured to execute the one or more instructions to:
after transmitting the result of the interpreting of the speech input into the second language to the second device, measure an actual interpretation time required from a first time point when a speaker's utterance for the speech input is finished to a second time point when reproduction of the result of the interpreting of the speech input into the second language is finished; and
decrease or increase the accumulated delay time by a difference between the first estimated interpretation time and the actual interpretation time required.

15. A method performed by a first device, the method comprising:
receiving a speech input in a first language;
transmitting the speech input in the first language to a second device and a third device;
receiving, from the second device, a first estimated interpretation time that indicates a first time expected to be required to interpret the speech input in the first language into a second language;

receiving, from the third device, a second estimated interpretation time that indicates a second time expected to be required to interpret the speech input in the first language into a third language; and providing interpretation situation information to at least one of the first device or the second device based on the first estimated interpretation time; and when the interpreting of the speech input into the third language is not finished, transmitting the interpretation situation information to the second device based on an accumulated delay time.

* * * * *